US011188187B2

(12) United States Patent
Tsurumi

(10) Patent No.: US 11,188,187 B2
(45) Date of Patent: *Nov. 30, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,423

(22) Filed: Feb. 1, 2019

(65) Prior Publication Data

US 2019/0163344 A1 May 30, 2019

Related U.S. Application Data

(63) Continuation of application No. 15/584,617, filed on May 2, 2017, now Pat. No. 10,198,146, which is a (Continued)

(30) Foreign Application Priority Data

Mar. 29, 2013 (JP) ................. 2013-072689

(51) Int. Cl.
*G06F 3/0481* (2013.01)
*G06T 19/00* (2011.01)
(Continued)

(52) U.S. Cl.
CPC ...... *G06F 3/04815* (2013.01); *G06F 3/04812* (2013.01); *G06T 7/74* (2017.01);
(Continued)

(58) Field of Classification Search
CPC .................. G06T 19/006; G06F 3/04815
See application file for complete search history.

(56) References Cited

U.S. PATENT DOCUMENTS 6,879,323 B1 4/2005 Takezawa et al.
8,797,352 B2 8/2014 Lefevre et al.
(Continued)

FOREIGN PATENT DOCUMENTS

CN 102708355 A 10/2012
CN 102750079 A 10/2012
(Continued)

OTHER PUBLICATIONS

Notice of Allowance and Fees Due for U..S. Appl. No. 15/584,617, dated Sep. 27, 2018, 05 pages.
(Continued)

*Primary Examiner* — Ryan R Yang
(74) *Attorney, Agent, or Firm* — Chip Law Group

(57) ABSTRACT

There is provided an information processing apparatus including an image acquisition part that acquires an image captured by an imaging part, and a display controller that causes a virtual object to be displayed in accordance with a recognition result of a real object shown in the image. The display controller controls the virtual object on a basis of a size of the real object in a real space.

18 Claims, 17 Drawing Sheets

Related U.S. Application Data continuation of application No. 14/169,223, filed on Jan. 31, 2014, now Pat. No. 9,665,982.

(51) Int. Cl.

| | | |
|---|---|---|
| *G06T 7/73* | (2017.01) | |
| *G06T 19/20* | (2011.01) | |
| *G06F 3/01* | (2006.01) | |
| *G06F 3/0488* | (2013.01) | |

(52) U.S. Cl.
CPC ............ *G06T 19/006* (2013.01); *G06T 19/20* (2013.01); *G06F 3/011* (2013.01); *G06F 3/017* (2013.01); *G06F 3/0488* (2013.01)

(56) References Cited

U.S. PATENT DOCUMENTS

| | | | |
|---|---|---|---|
| 8,891,855 B2 | 11/2014 | Miyashita et al. | |
| 9,665,982 B2 * | 5/2017 | Tsurumi ................. | G06T 19/20 |
| 10,198,146 B2 * | 2/2019 | Tsurumi ................. | G06T 19/006 |
| 2005/0024360 A1 | 2/2005 | Abe et al. | |
| 2008/0100320 A1 * | 5/2008 | Miller ................. | G01R 1/07385 |
| | | | 324/754.03 |
| 2011/0216090 A1 | 9/2011 | Woo et al. | |
| 2012/0210225 A1 | 8/2012 | McCoy et al. | |
| 2012/0210255 A1 | 8/2012 | Ooi et al. | |
| 2012/0230581 A1 | 9/2012 | Miyashita et al. | |
| 2012/0250940 A1 | 10/2012 | Kasahara | |
| 2014/0049559 A1 | 2/2014 | Fleck et al. | |
| 2014/0282224 A1 * | 9/2014 | Pedley .................. | G06F 3/0485 |
| | | | 715/784 |
| 2014/0282278 A1 * | 9/2014 | Anderson ........... | G06F 3/04883 |
| | | | 715/863 |
| 2014/0362084 A1 | 12/2014 | Ooi et al. | |
| 2015/0077434 A1 | 3/2015 | Fukuchi et al. | |

FOREIGN PATENT DOCUMENTS

| | | |
|---|---|---|
| CN | 102792338 A | 11/2012 |
| JP | 2004-046326 A | 2/2004 |
| JP | 2006-072667 A | 3/2006 |
| JP | 2009-237845 A | 10/2009 |
| JP | 2011-118834 A | 6/2011 |
| JP | 2012-074014 A | 4/2012 |
| JP | 2012-168798 A | 9/2012 |
| JP | 2012-226529 A | 11/2012 |
| JP | 2013-008257 A | 1/2013 |
| JP | 2013-027628 A | 2/2013 |
| WO | 2010/024486 A1 | 3/2010 |

OTHER PUBLICATIONS

Non-Final Rejection for U.S. Appl. No. 15/584,617, dated May 10, 2018, 07 pages.

Office Action for CN Patent Application No. 201410108370.7, dated Feb. 20, 2017, 09 pages of Office Action and 13 pages of English Translation.

Andrew J. Davison, "Real-Time Simultaneous Localisation and Mapping with a Single Camera", Robotics Research Group, Dept of Engineering Science, University of Oxford, Oct. 2003, 08 pages.

Japanese Office Action for Japanese Patent Application No. 2013-072689.

Non-Final Rejection for U.S. Appl. No. 14/169,223, dated Dec. 21, 2015,11 pages.

Final Rejection for U.S. Appl. No. 14/169,223, dated May 13, 2016, 12 pages.

Advisory Action for U.S. Appl. No. 14/169,223, dated Jul. 28, 2016, 03 pages.

Non-Final Rejection for U.S. Appl. No. 14/169,223, dated Sep. 23, 2016, 12 pages.

Notice of Allowance and Fees Due for U.S. Appl. No. 14/169,223, dated Jan. 30, 2017, 07 pages.

* cited by examiner

FIG.3
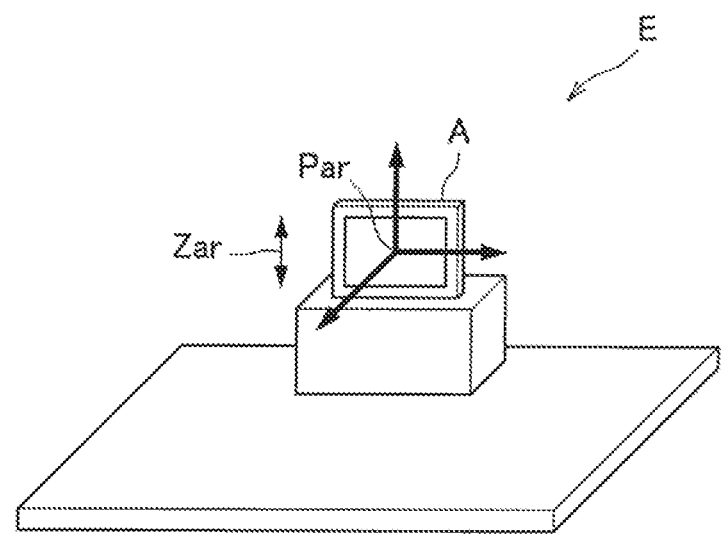
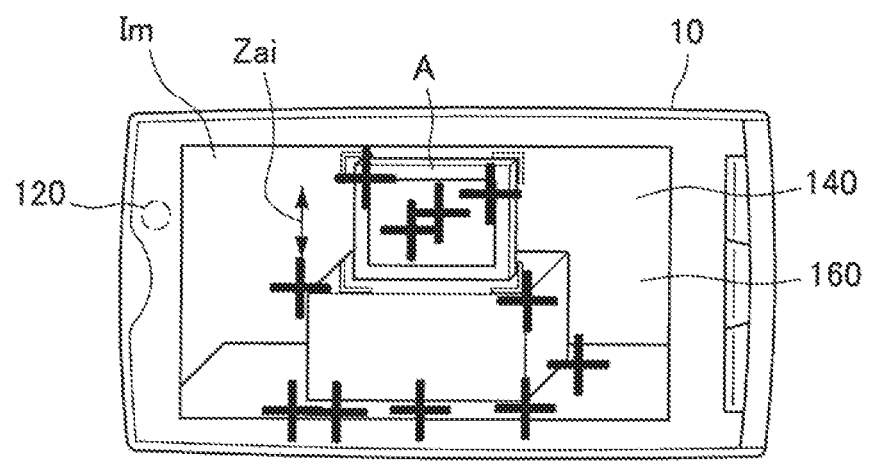

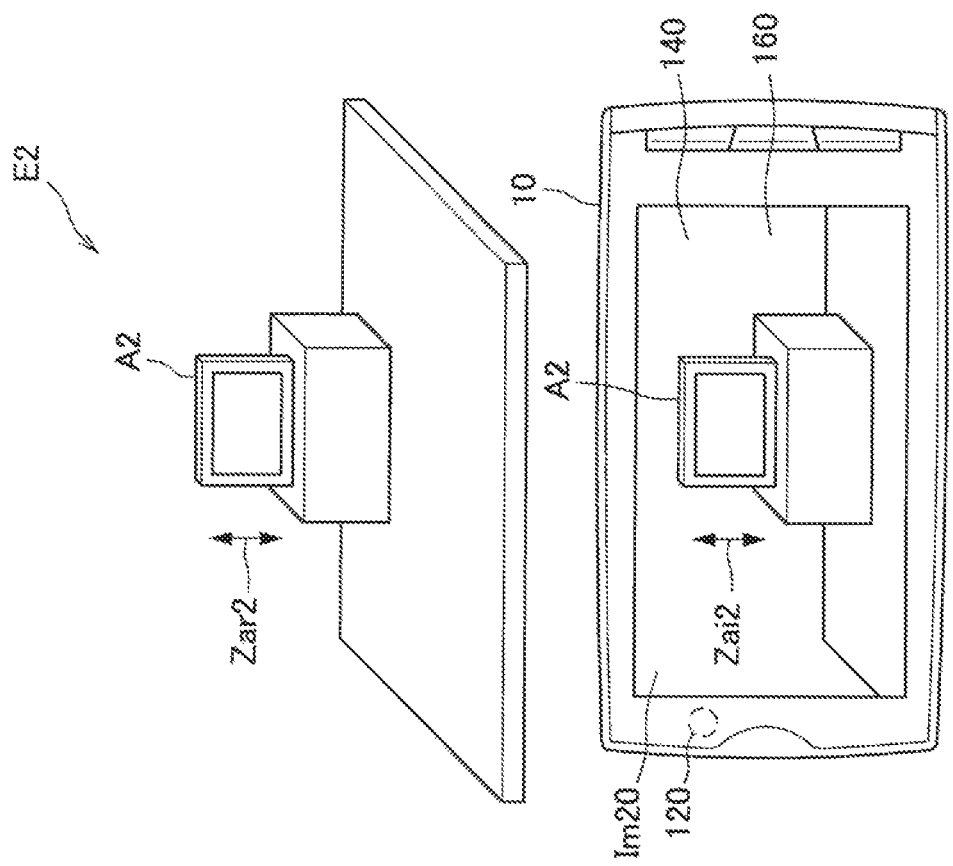
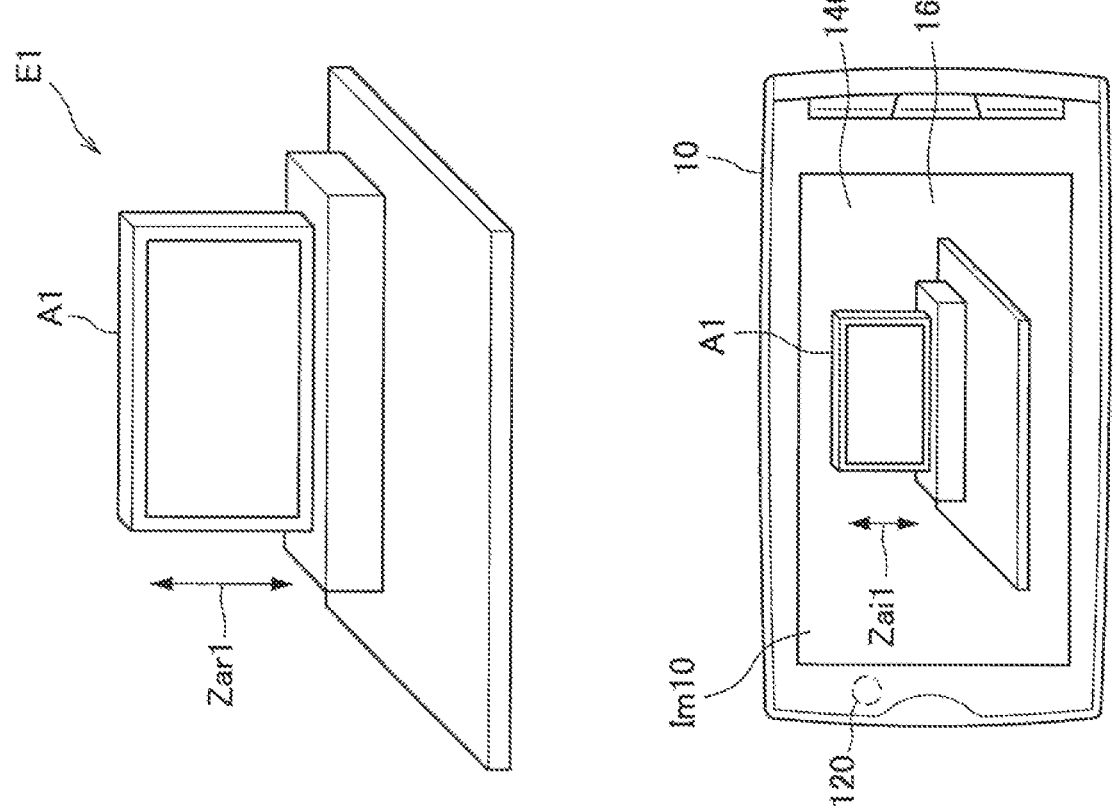
FIG.4

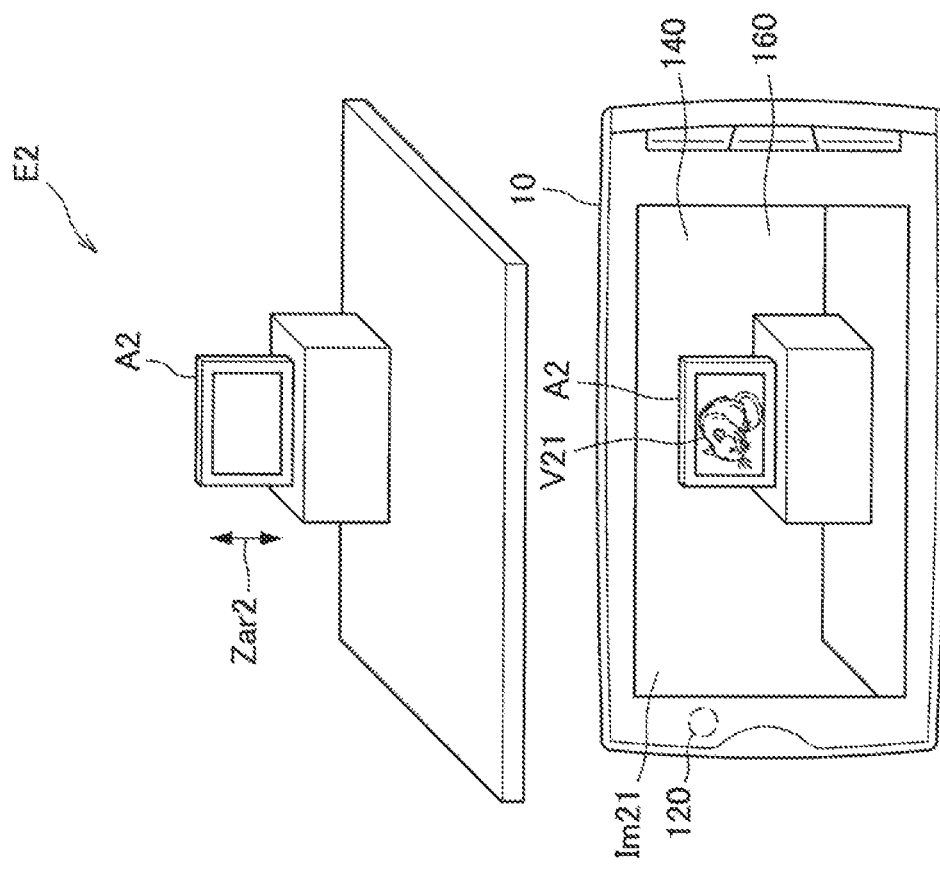
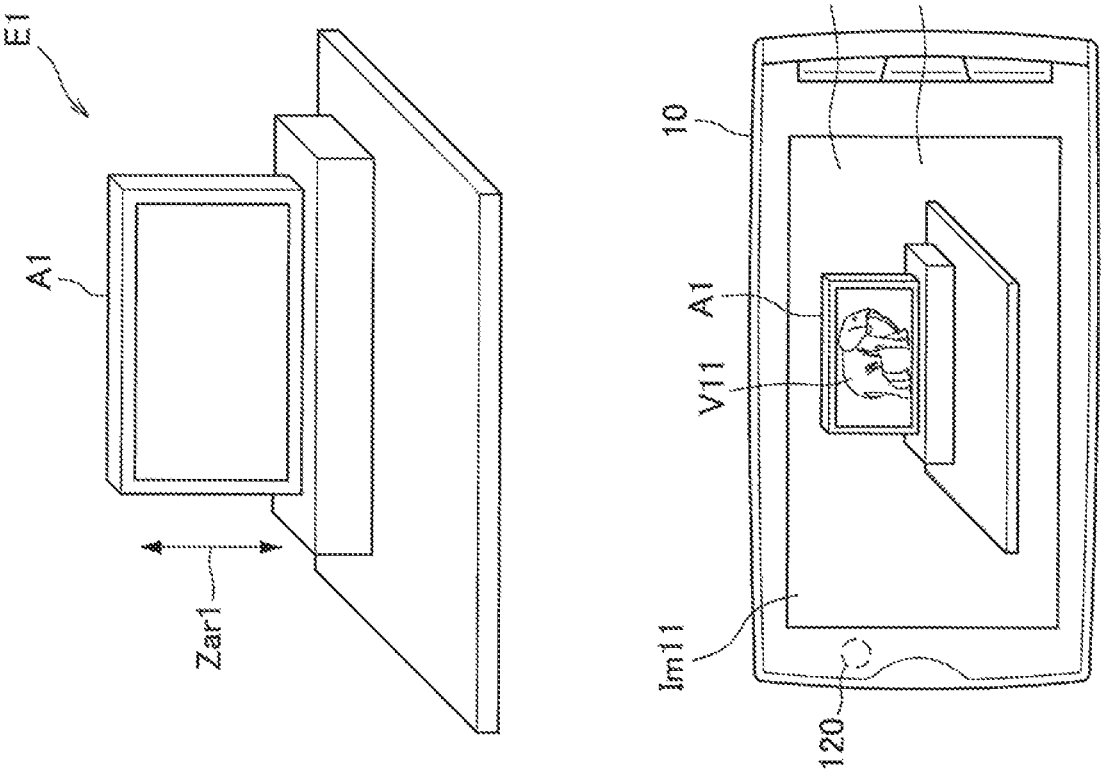
FIG.5

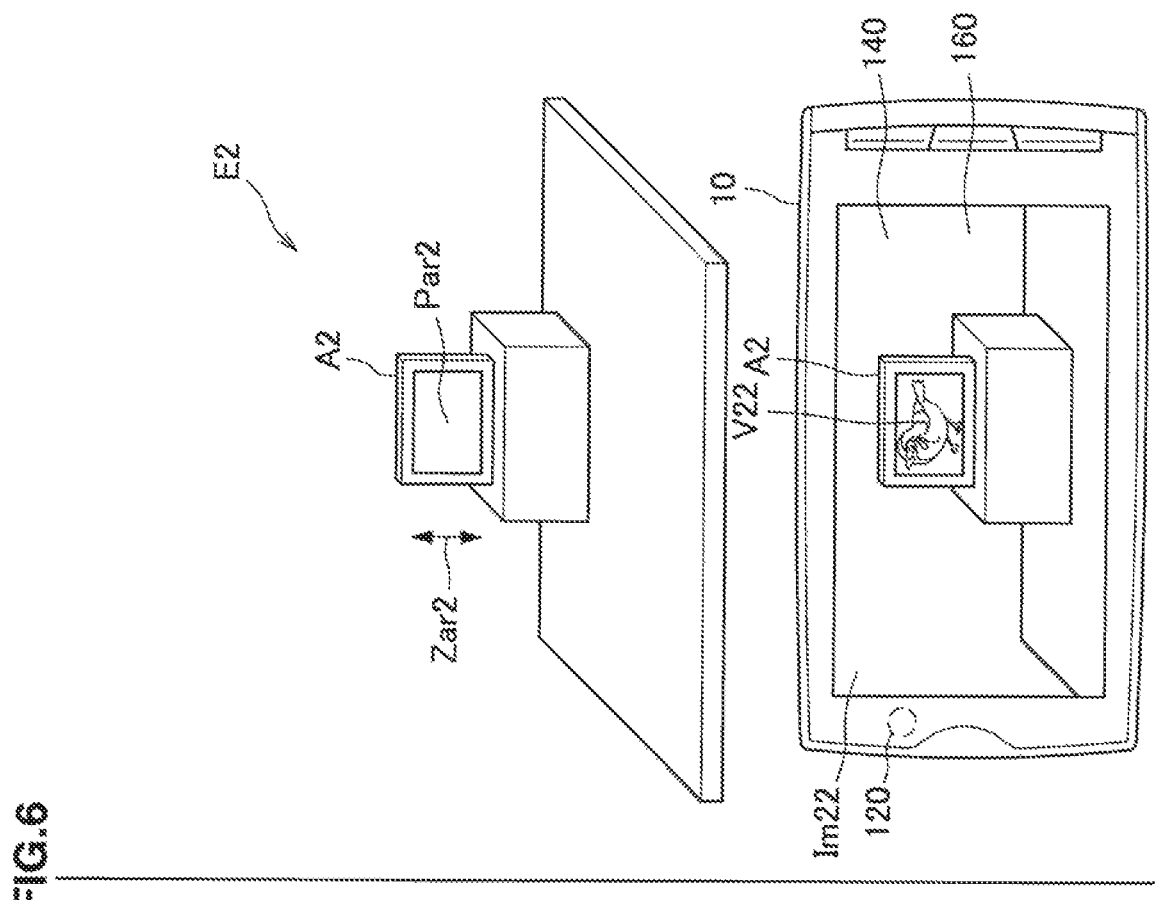
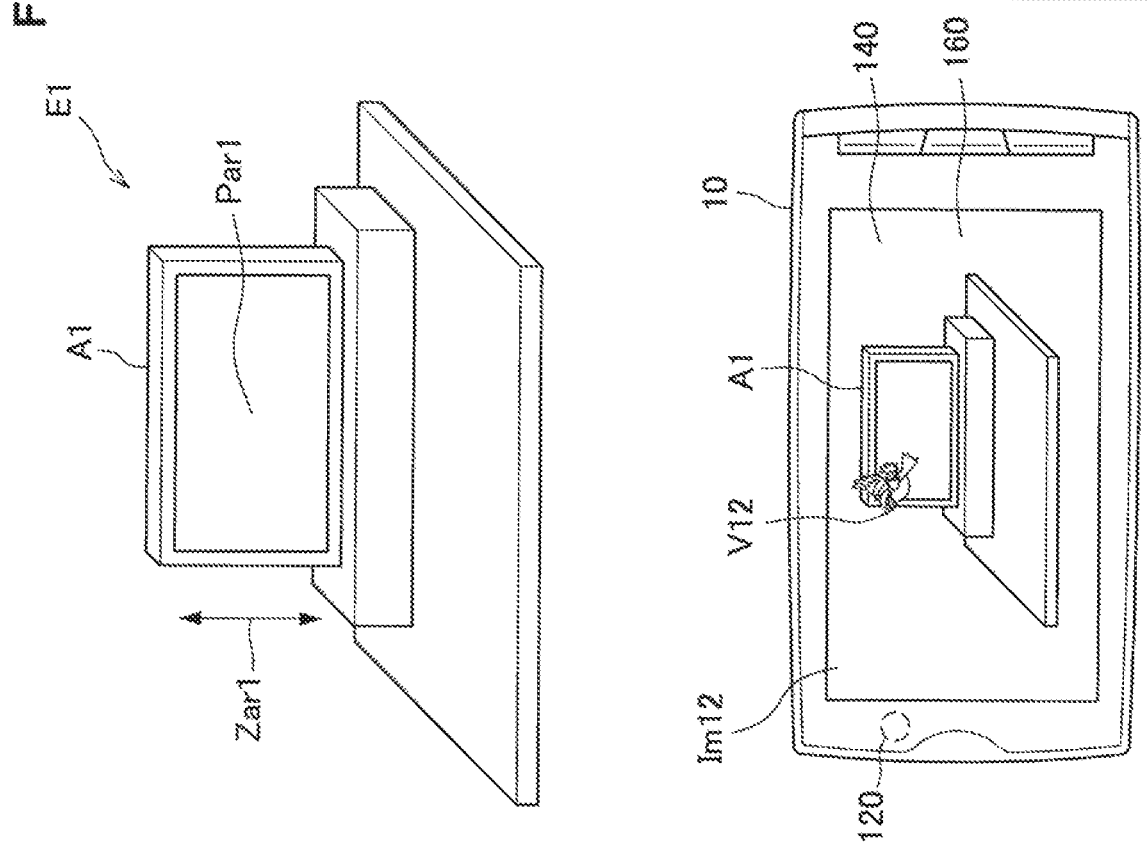
FIG.6

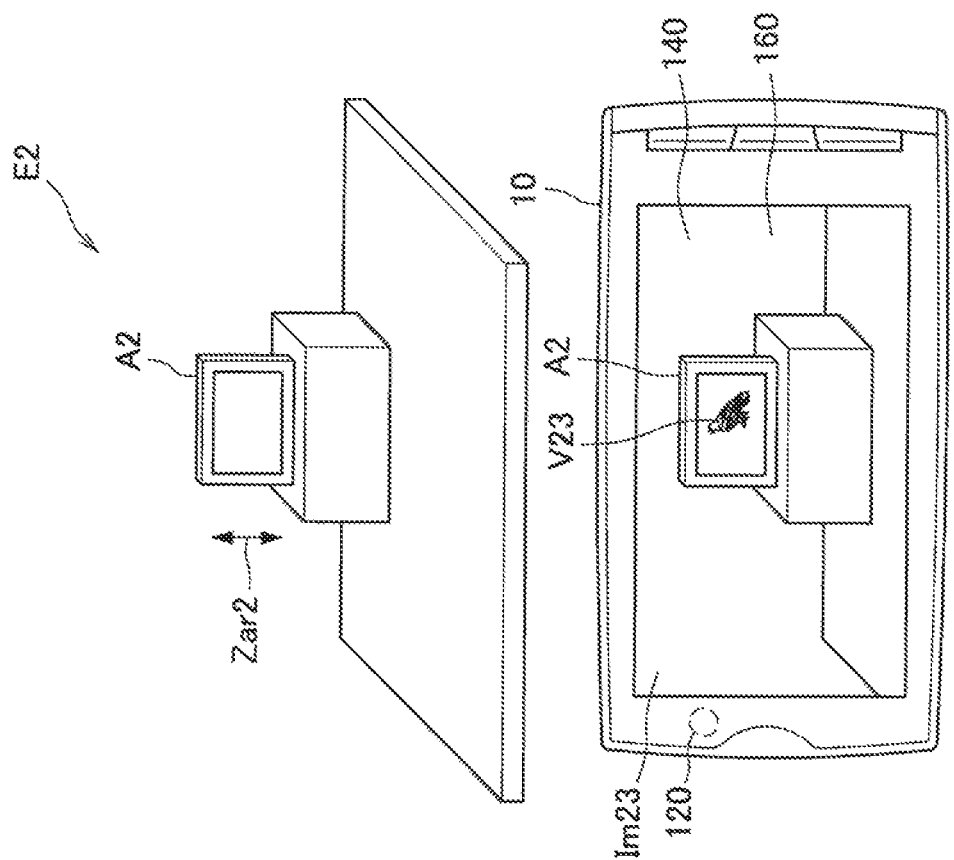
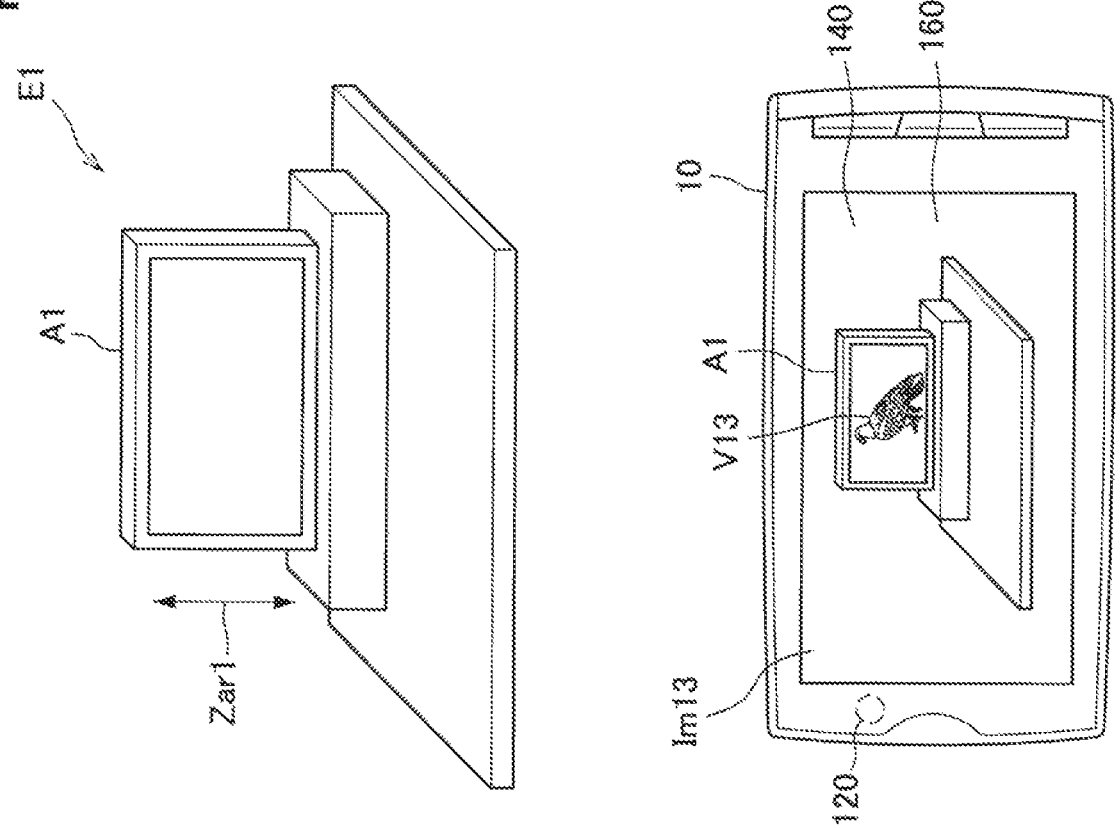
FIG.7

CONTINUE ENVIRONMENT RECOGNITION

FIG.13
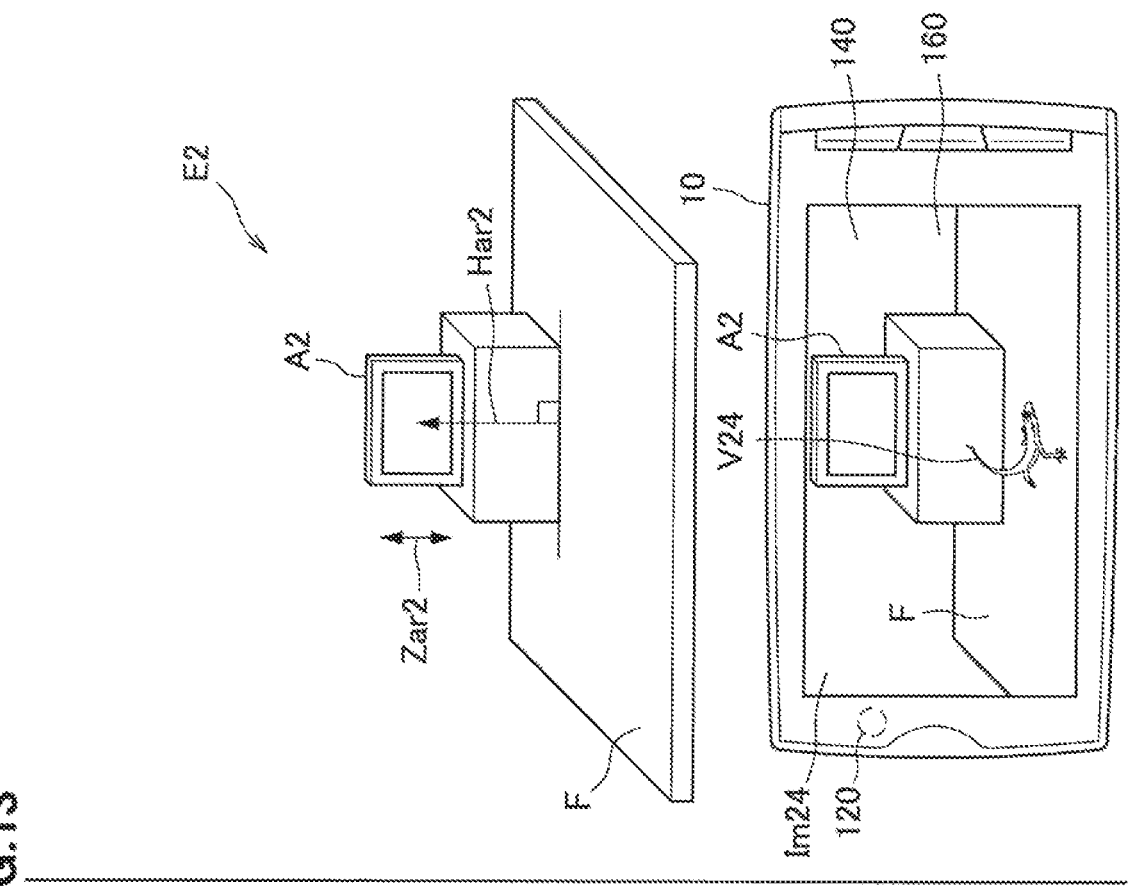
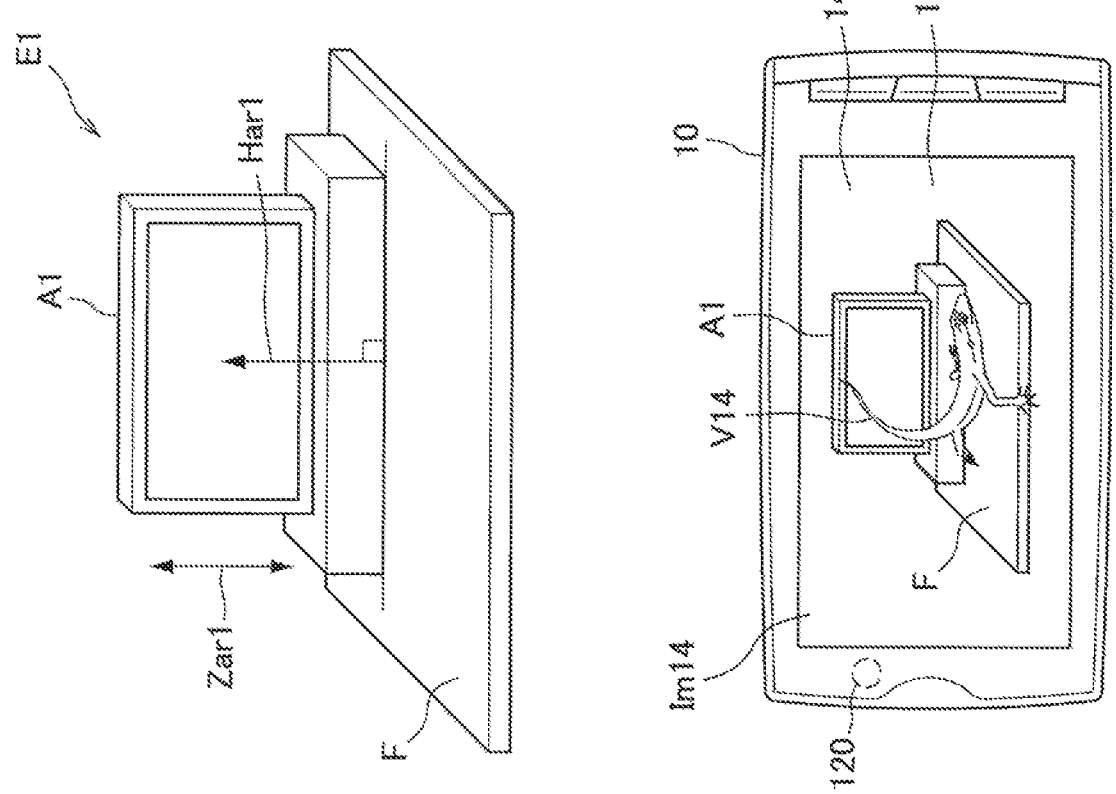

FIG.14
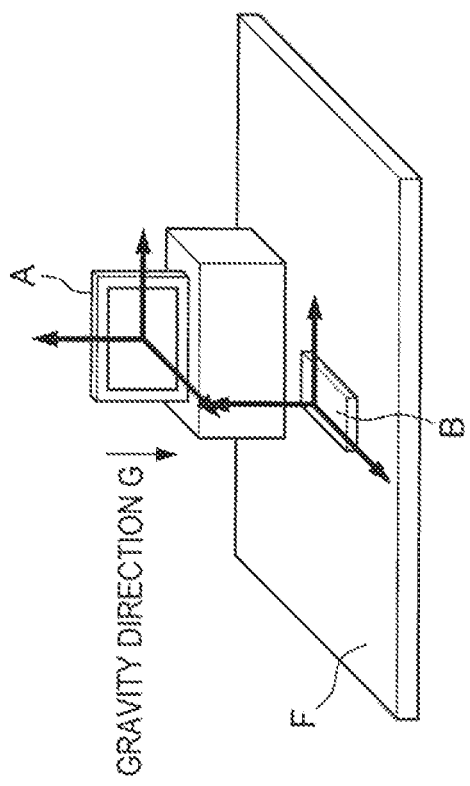
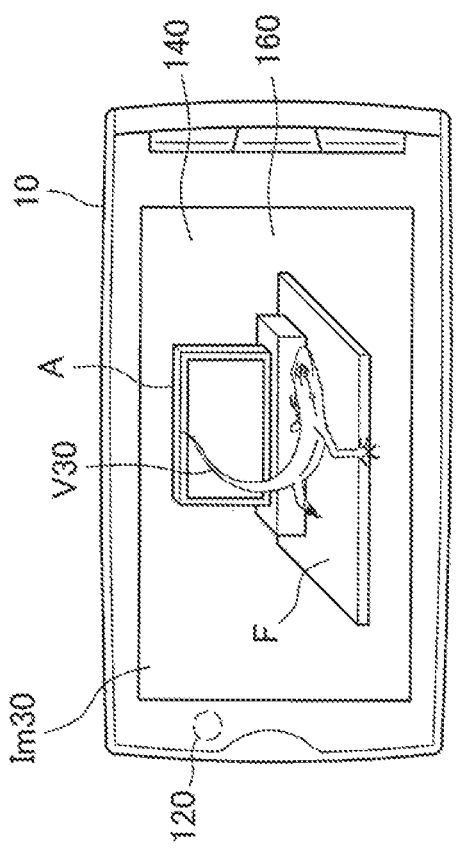
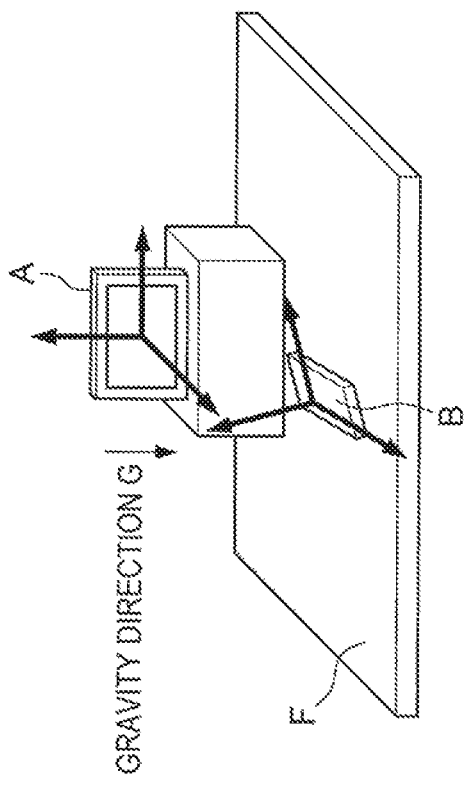
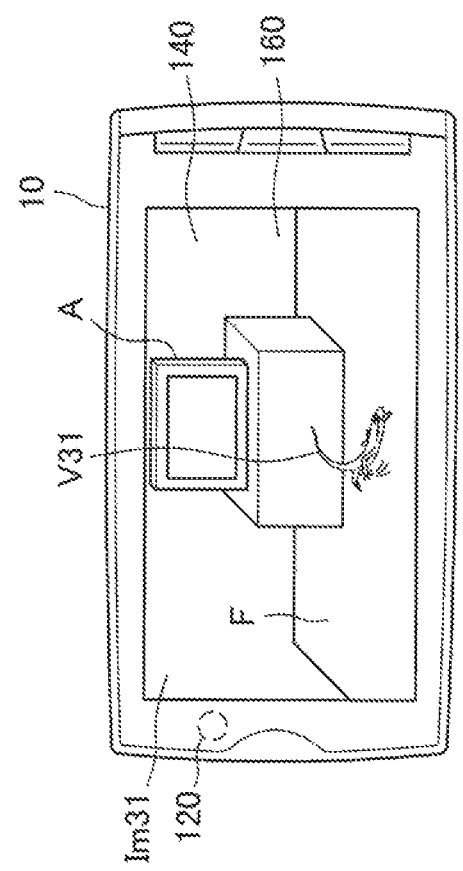

FIG. 15
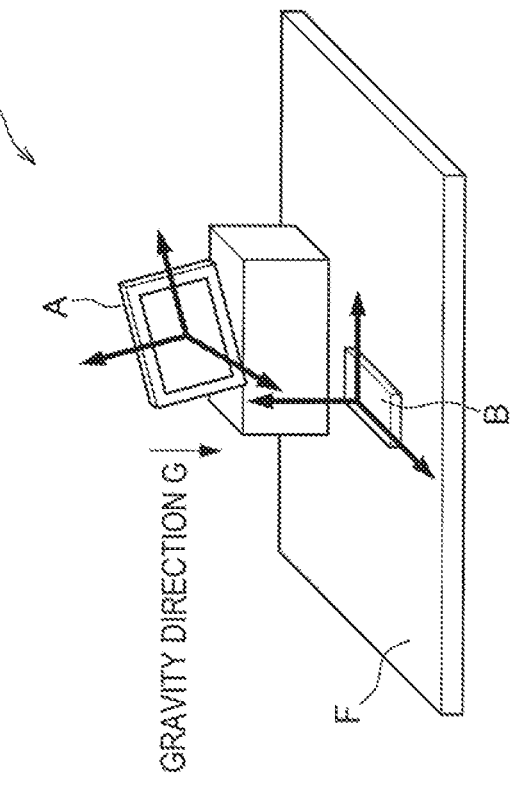
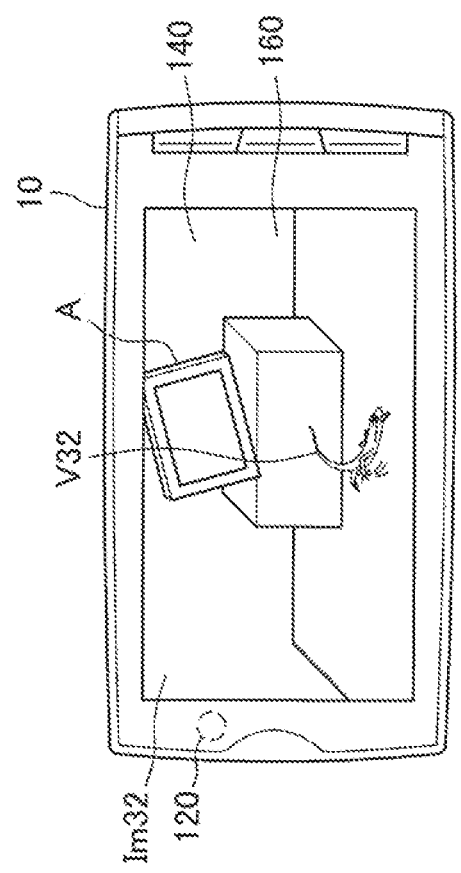
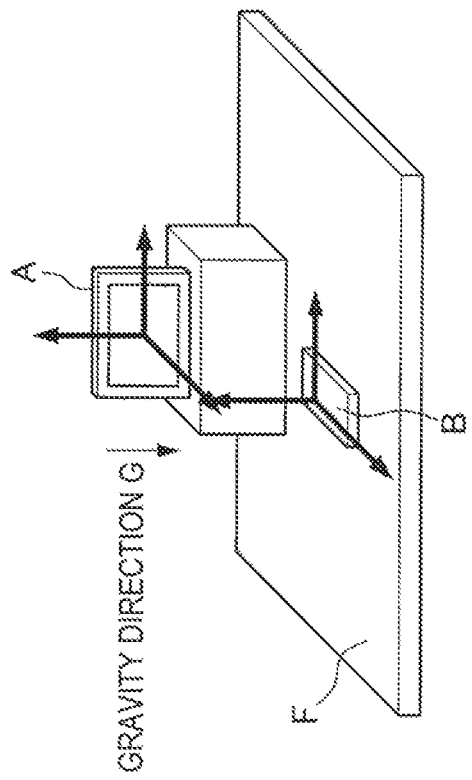
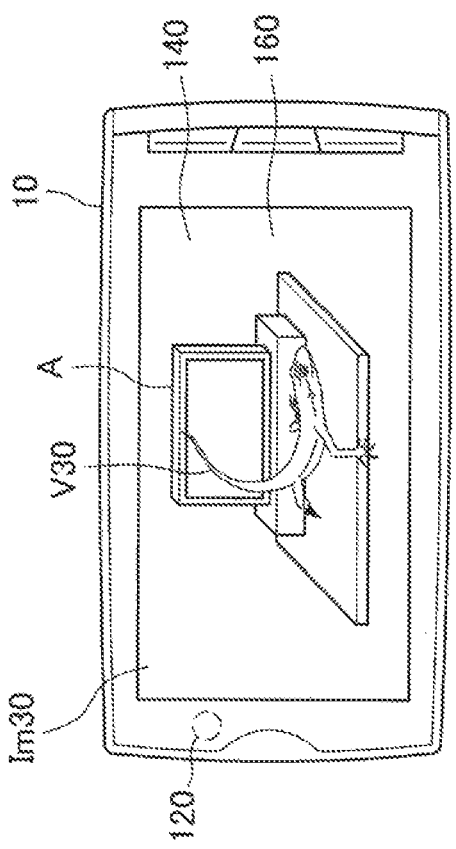

INFORMATION PROCESSING APPARATUS, INFORMATION PROCESSING METHOD, AND RECORDING MEDIUM

CROSS REFERENCE TO RELATED APPLICATIONS

The present application is a continuation application of U.S. patent application Ser. No. 15/584,617, filed on May 2, 2017, which is a continuation of U.S. patent application Ser. No. 14/169,223 filed on Jan. 31, 2014, now U.S. Pat. No. 9,665,982, which claims priority from prior Japanese Patent Application JP 2013-072689 filed in the Japan Patent Office on Mar. 29, 2013, the entire contents of which are hereby incorporated by reference.

BACKGROUND

The present disclosure relates to an information processing apparatus, an information processing method, and a recording medium.

A technology called augmented reality (AR) has recently been drawing attention, which shows a user a real space having additional information superimposed thereover. The information shown to the user in the AR technology may be visualized using various forms of virtual objects such as text, icons, or animation. The placement of annotation over an AR space is generally executed on the basis of recognition in three-dimensional structure in the real space shown in an image.

A structure from motion (SfM) technique and a simultaneous localization and mapping (SLAM) technique are known as techniques for recognizing a three-dimensional structure in the real space. In the SfM technique, multiple images are captured from different viewpoints, and, from those images, a three-dimensional structure in the real space shown in the images is recognized using parallax. The SLAM technique is described in Andrew J. Davison, "Real-Time Simultaneous Localization and Mapping with a Single Camera", Proceedings of the 9th IEEE International Conference on Computer Vision Volume 2, 2003, pp. 1403-1410. JP 2009-237845A discloses a technique for recognizing three-dimensional positions of feature points, which are selected for initialization in the SLAM technique, by using the SfM technique.

SUMMARY

A virtual object to be added to a real space may be generally controlled on the basis of a size of a real object in an image. However, the size of the real object in the image may change in accordance with a distance between an imaging part and the real object, and the like. Accordingly, it is difficult to say that the size of the real object in the real space is sufficiently taken into account only by taking the size of the real object in an image into account.

In light of the foregoing, it is desirable in the present disclosure to provide technology for making it possible to control the virtual object taking the size of the real object in the real space into account.

According to an embodiment of the present disclosure, there is provided an information processing apparatus which includes an image acquisition part configured to acquire an image captured by an imaging part, and a display controller configured to cause a virtual object to be displayed in accordance with a recognition result of a real object shown in the image. The display controller controls the virtual object on a basis of a size of the real object in a real space.

According to another embodiment of the present disclosure, there is provided an information processing method which includes acquiring an image captured by an imaging part, causing a virtual object to be displayed in accordance with a recognition result of a real object shown in the image, and controlling the virtual object on a basis of a size of the real object in a real space.

According to another embodiment of the present disclosure, there is provided a non-transitory computer-readable recording medium having a program recorded thereon, the program being for causing a computer to function as an information processing apparatus including an image acquisition part configured to acquire an image captured by an imaging part, and a display controller configured to cause a virtual object to be displayed in accordance with a recognition result of a real object shown in the image. The display controller controls the virtual object on a basis of a size of the real object in a real space.

According to one or more of embodiments of the present disclosure, it is possible to control the virtual object taking the size of the real object in the real space into account.

BRIEF DESCRIPTION OF THE DRAWINGS

FIG. 3 is a diagram illustrating an example of a technique for recognizing a real object from an image captured by an imaging part;

FIG. 4 is a diagram illustrating a case where two types of real objects each having a different size in a real space are recognized;

FIG. 5 is a diagram showing an example of selecting a virtual object on the basis of a size of a real object in a real space;

FIG. 6 is a diagram showing an example of controlling a motion of a virtual object on the basis of a size of a real object in a real space;

FIG. 7 is a diagram showing an example of controlling a size of a virtual object in an image on the basis of a size of a real object in a real space;

FIG. 13 is a diagram illustrating an example of controlling a virtual object on the basis of a distance in a real space between a real object and a floor surface;

FIG. 14 is a diagram showing an example of controlling a virtual object on the basis of a relationship between a gravity direction and an attitude of a predetermined subject;

FIG. 15 is a diagram showing an example of controlling a virtual object on the basis of a relationship between an attitude of a predetermined subject and an attitude of a floor surface;

DETAILED DESCRIPTION OF THE EMBODIMENT(S)

Figure 1:
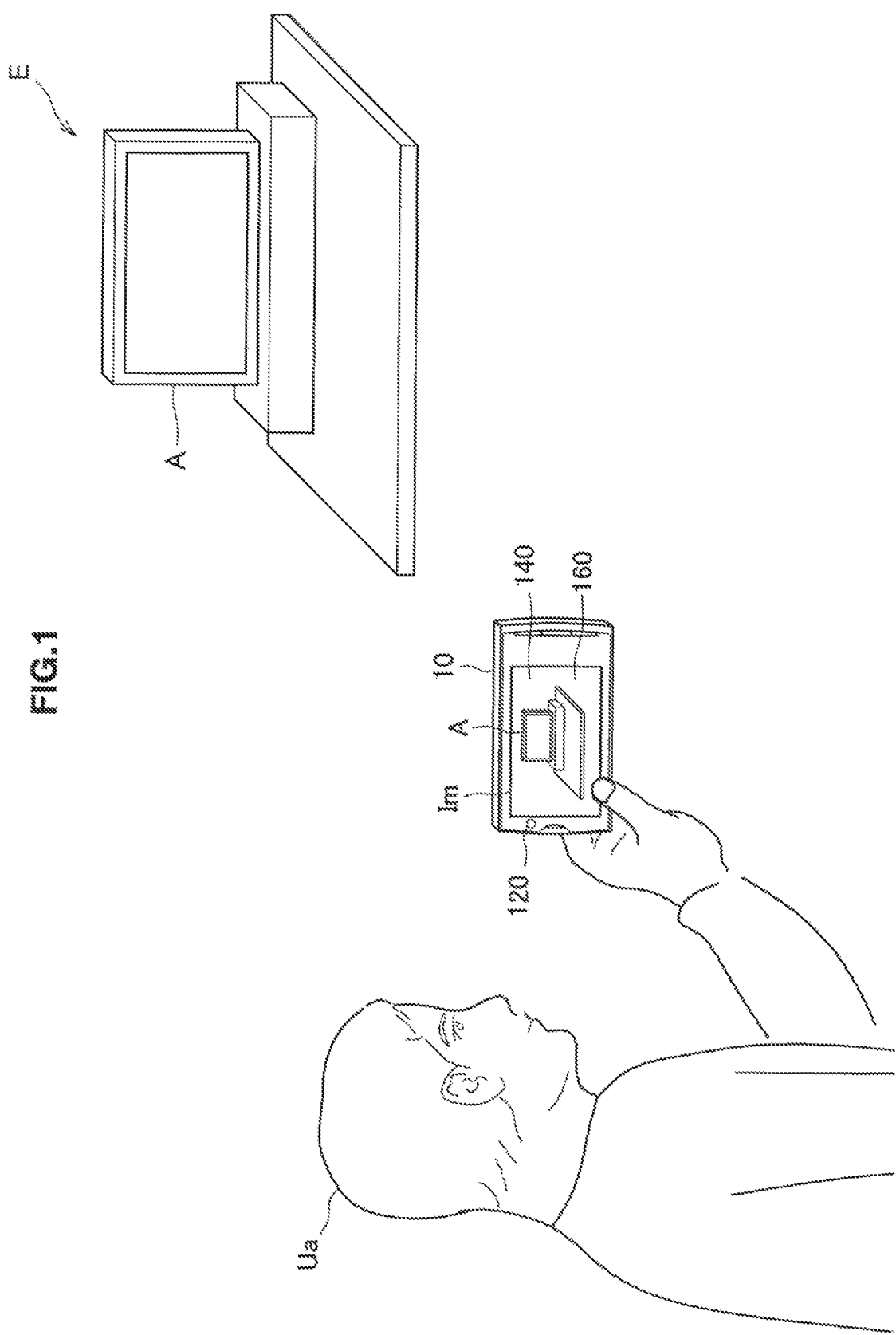
FIG. 1 is a diagram illustrating an overview of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets or numbers after the same reference numeral. Note that, in the case where it is not necessary to distinguish the multiple structural elements that have substantially the same function and structure from one another, the multiple structural elements are denoted with the same reference numeral only.

Further, the "detailed description of the embodiments" will be described in the following order.
1. Overview of information processing apparatus
2. First embodiment
2-1. Functional configuration example of information processing apparatus
2-2. Technique for recognizing real object
2-3. Example of display control
2-4. Operation example of information processing apparatus
3. Second embodiment
3-1. Functional configuration example of information processing apparatus
3-2. Size of real object in real space
3-3. Example of display control
3-4. Operation example of information processing apparatus
4. Hardware configuration example
5. Conclusion

1. Overview of Information Processing Apparatus

First, an overview of an information processing apparatus 10 according to an embodiment of the present disclosure will be described. FIG. 1 is a diagram illustrating an overview of the information processing apparatus 10 according to an embodiment of the present disclosure. Referring to FIG. 1, there is shown the information processing apparatus 10 held by a user Ua. The information processing apparatus 10 includes an imaging part 120, which is directed towards a real space E, an operation part 140, and a display part 160. The imaging part 120 generates an image by capturing the real space E.

In the example shown in FIG. 1, the display part 160 displays an image Im captured by the imaging part 120. The user Ua is capable of grasping the real space E by placing a viewpoint on the image Im displayed by the display part 160. However, the image Im may not necessarily be displayed on the display part 160. For example, in the case where the display part 160 is a transmissive head mounted display (HMD), the display part 160 does not display the image Im, and the user Ua may place the viewpoint directly on the real space E instead of the image Im.

Further, a real object A is shown in the image Im. For example, when the real object A is recognized from the image Im, the information processing apparatus 10 places a virtual object in an AR space corresponding to the real space E on the basis of the recognition result of the real object A. In this way, the user Ua can view the virtual object placed in the AR space by the information processing apparatus 10 via the display part 160. The real object A may be recognized by the information processing apparatus 10, or may be recognized by a device (for example, server) that is different from the information processing apparatus 10.

Here, a virtual object to be added to the real space E is generally controlled on the basis of the size of the real object A in the image Im. However, the size of the real object A in the image Im may change in accordance with a distance between the imaging part 120 and the real object A. Accordingly, it is difficult to say that the size of the real object A in the real space E is sufficiently taken into account only by taking the size of the real object A in the image Im into account.

In light of the foregoing, the present disclosure proposes technology for making it possible to control the virtual object taking the size of the real object A in the real space E into account. In a first embodiment of the present disclosure, description will be mainly made of the case where the size of the real object A in the real space E is known, and, in a second embodiment of the present disclosure, description will be mainly made of the case where the size of the real object A in the real space E is calculated.

Note that, although description below will be made as an example of the case where the information processing apparatus 10 is employed as a camera-equipped smartphone, the information processing apparatus 10 may also be employed as a device other than a smartphone. For example, the information processing apparatus 10 may be employed as a video camera, a digital camera, a personal digital assistant (PDA), a personal computer (PC), a mobile phone, a mobile music playback device, a mobile video processing device, a mobile game console, a telescope, or a binocular.

Heretofore, an overview of the information processing apparatus 10 according to an embodiment of the present disclosure has been described. Next, the first embodiment of the present disclosure and the second embodiment of the present disclosure will be described in the stated order. Note that the functions of the information processing apparatus 10 described in the first embodiment of the present disclosure and the functions of the information processing apparatus 10 described in the second embodiment of the present disclosure may be used in combination, or only some of the functions may be used in combination.

2. First Embodiment

Subsequently, a first embodiment of the present disclosure will be described.

2-1. Functional Configuration Example of Information Processing Apparatus

Figure 2:
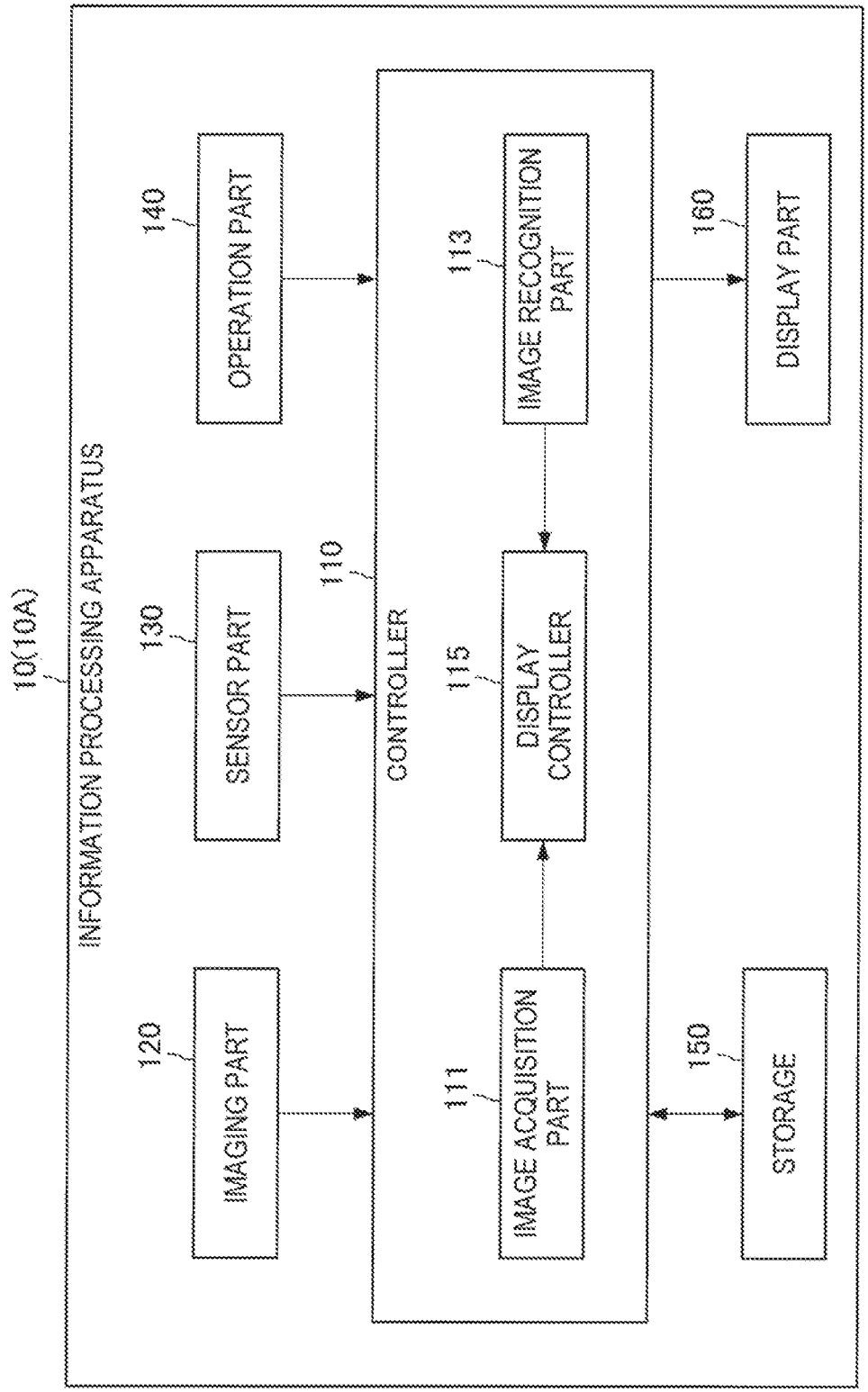
FIG. 2 is a diagram showing a functional configuration example of the information processing apparatus according to the first embodiment of the present disclosure.

First, a functional configuration example of an information processing apparatus 10A according to the first embodiment of the present disclosure will be described. FIG. 2 is a diagram showing a functional configuration example of the information processing apparatus 10A according to the first embodiment of the present disclosure. As shown in FIG. 2, the information processing apparatus 10A includes a controller 110, the imaging part 120, a sensor part 130, the operation part 140, a storage 150, and the display part 160.

The controller 110 corresponds to, for example, a processor such as a central processing unit (CPU) or a digital signal processor (DSP). The controller 110 exhibits various functions that the controller 110 has by executing a program stored in the storage 150 or another storage medium. The controller 110 has functional blocks such as an image acquisition part 111, an image recognition part 113, and a display controller 115. The functions of the respective functional blocks will be described later.

The imaging part 120 is a camera module that captures an image Im. The imaging part 120 captures a real space E using an image sensor such as a charge coupled device (CCD) or a complementary metal oxide semiconductor (CMOS), and generates an image Im. The image Im generated by the imaging part 120 is output to the controller 110. Note that, although the imaging part 120 is provided in an integrated manner with the information processing apparatus 10A in the example shown in FIG. 2, the imaging part 120 may be provided separately from the information processing apparatus 10A. For example, an imaging device connected to the information processing apparatus 10A via wire or radio may be used as the imaging part 120.

The sensor part 130 acquires sensor data. For example, the sensor part 130 includes a 3-axis acceleration sensor. The 3-axis acceleration sensor measures gravitational acceleration applied to the imaging part 120, and generates sensor data (acceleration data) that shows the size and the direction of the gravitational acceleration in three dimensions. Additionally, the sensor part 130 may include a geomagnetic sensor. The geomagnetic sensor generates sensor data (geomagnetic data) showing the direction of geomagnetism of the imaging part 120 in a coordinate system. Further, the sensor part 130 may also include a positioning sensor (for example, global positioning system (GPS) sensor). The positioning sensor generates sensor data (positioning data) showing the latitude and the longitude of the information processing apparatus 10A in the real space. Note that, although the sensor part 130 is provided in an integrated manner with the information processing apparatus 10A in the example shown in FIG. 2, the sensor part 130 may be provided separately from the information processing apparatus 10A.

The operation part 140 detects an operation performed by a user and outputs the operation to the controller 110. In the present specification, since a case is assumed where the operation part 140 is formed of a touch panel, the operation performed by the user corresponds to an operation of tapping the touch panel. However, the operation part 140 may also be formed of hardware other than a touch panel (for example, button). Note that, although the operation part 140 is provided in an integrated manner with the information processing apparatus 10A in the example shown in FIG. 2, the operation part 140 may be provided separately from the information processing apparatus 10A.

The storage 150 uses a recording medium such as semiconductor memory or a hard disk to store a program for causing the controller 110 to operate. Further, for example, the storage 150 can also store various types of data (for example, various types of sensor data and virtual objects) used by the program. Note that, although the storage 150 is provided in an integrated manner with the information processing apparatus 10A in the example shown in FIG. 2, the storage 150 may be provided separately from information processing apparatus 10A.

The display part 160 displays various types of information in accordance with the control performed by the display controller 115. For example, the display part 160 displays an image of an AR application generated by the information processing apparatus 10A. The display part 160 is formed of, for example, a liquid crystal display (LCD) or an organic electroluminescence (EL) display device. Note that, although the display part 160 is provided in an integrated manner with the information processing apparatus 10A in the example shown in FIG. 2, the display part 160 may be provided separately from the information processing apparatus 10A. For example, a display device connected to the information processing apparatus 10A via wire or radio may be used as the display part 160.

Heretofore, a functional configuration example of the information processing apparatus 10A according to the first embodiment of the present disclosure has been described.

2-2. Technique for Recognizing Real Object

First, a technique for recognizing a real object A will be described. FIG. 3 is a diagram illustrating an example of a technique for recognizing a real object A from an image Im captured by the imaging part 120. Referring to FIG. 3, in an image Im captured by the imaging part 120, there is shown a real object A. Further, the real object A is recognized by the image recognition part 113, and a virtual object associated with the recognition result is placed in an AR space corresponding to the real space by the display controller 115.

In more detail, when the image recognition part 113 recognizes the position and the attitude of the real object A, the display controller 115 identifies the position of the virtual object in accordance with the position of the real object A, also identifies the attitude of the virtual object in accordance with the attitude of the real object A, and places the virtual object in accordance with the identified position and attitude. The relationship between the position of the real object A and the position of the virtual object may be determined in advance. Further, the relationship between the attitude of the real object A and the attitude of the virtual object may also be determined in advance.

For example, the image recognition part 113 checks a partial image included in the image Im against patches of respective feature points included in feature data, and detects feature points included in the image Im. In the case where the feature points belonging to the real object A are detected in high density in a region within the image Im, the image recognition part 113 may recognize that the real object A is shown in the region. The image recognition part 113 may further recognize the position and the attitude of the recognized real object A on the basis of positional relationship between the detected feature points and three-dimensional shape data.

In the example shown in FIG. 3, a block is disposed on the floor surface, and a television apparatus serving as an example of the real object A is placed on the block. However, the type of the real object A is not particularly limited. Referring to FIG. 3, the size of the real object A in the real space E is represented by a size Zar, and the size of the real object A in the image Im is represented by a size Zai. Note that, although the height of the real object A is set as the size of the real object A in the example shown in FIG. 3, the size of the real object A may be a length of a part other than the height of the real object A.

Here, when the user Ua holds the imaging part 120 over the real object A and the image recognition part 113 recognizes the real object A, a virtual object associated with the recognition result is placed in the AR space corresponding to the real space E by the display controller 115. In that case, for controlling the virtual object, it is the size Zai of the real object A in the image Im that is generally taken into account, not the size Zar of the real object A in the real space E.

FIG. 4 is a diagram illustrating a case where two types of real objects A each having a different size in a real space E are recognized. Referring to FIG. 4, there is a real object A1 in a real space E1, the size of the real object A1 in the real space E1 is represented by a size Zar1, and the image recognition part 113 recognizes the size of the real object A1 in an image Im10 as a size Zai1.

On the other hand, there is a real object A2 in a real space E2, the size of the real space E2 in the real object A2 is represented by a size Zar2, and the image recognition part 113 recognizes the size of the real object A2 in an image Im20 as a size Zai2. For example, referring to FIG. 4, the size Zar1 of the real object A1 in the image Im10 is about the same as the size Zar2 of the real object A2 in the image Im20.

However, in reality, the distance between the imaging part 120 and the real object A1 is longer than the distance between the imaging part 120 and the real object A2. Instead, the size Zar1 of the real object A1 in the real space E1 is larger than the size Zar2 of the real object A2 in the real space E2. In this way, the size of the real object A in the real space E is usually not directly grasped only from the size of the real object A in the image Im.

Accordingly, in the first embodiment of the present disclosure, the image acquisition part 111 acquires an image Im captured by the imaging part 120, and the display controller 115 causes a virtual object to be displayed in accordance with a recognition result of a real object A shown in the image Im. In that case, the display controller 115 controls the virtual object on the basis of the size of the real object A in the real space E. According to such a configuration, it becomes possible to control the virtual object taking the size of the real object A in the real space E into account.

According to the first embodiment of the present disclosure, the display controller 115 is capable of acquiring the size of the real object A in the real space E. The size of the real object A in the real space E may be registered in the storage 150 in advance, may be input by a user through the operation part 140, and may be received by another device.

2-3. Example of Display Control

Here, various techniques may be employed as a method for controlling a virtual object. FIG. 5 is a diagram showing an example of selecting a virtual object on the basis of a size of a real object A in a real space E. First, with reference to FIG. 5, an example of selecting a virtual object on the basis of the size of the real object A in the real space E will be described.

Referring to FIG. 5, in the same manner as the case shown in FIG. 4, a size of a real object A1 in a real space E1 is a size Zar1. The display controller 115 may select a virtual object V11 having a size corresponding to the size Zar1 of the real object A1 in the real space E1. For example, the display controller 115 may select the virtual object V11 in the case where the size Zar1 of the real object A1 in the real space E1 exceeds a predetermined threshold. The virtual object V11 is not particularly limited.

On the other hand, referring to FIG. 5, in the same manner as the case shown in FIG. 4, a size of a real object A2 in a real space E2 is a size Zar2. The display controller 115 may select a virtual object V21 having a size corresponding to the size Zar2 of the real object A2 in the real space E2. For example, the display controller 115 may select the virtual object V21 in the case where the size Zar2 of the real object A2 in the real space E2 is lower than a predetermined threshold. The virtual object V21 is not particularly limited.

Heretofore, although an example for selecting a virtual object on the basis of the size of the real object A in the real space E has been described, the display controller 115 may also control a display mode of the virtual object in accordance with the size of the real object A in the real space E. For example, the display controller 115 may control a motion of a virtual object in accordance with the size of the real object A in the real space.

FIG. 6 is a diagram showing an example of controlling a motion of a virtual object on the basis of a size of a real object A in a real space E. With reference to FIG. 6, an example of controlling a motion of a virtual object on the basis of the size of the real object A in the real space E will be described.

Referring to FIG. 6, in the same manner as the case shown in FIG. 4, a size of a real object A1 in a real space E1 is a size Zar1. The display controller 115 may control a motion of a virtual object V12 on the basis of the size Zar1 of the real object A1 in the real space E1. For example, the display controller 115 may perform control such that the virtual object V12 has a predetermined first motion in the case where the size Zar1 of the real object A1 in the real space E1 exceeds a predetermined threshold. The predetermined first motion is not particularly limited, and corresponds to, in the example shown in FIG. 6, the motion that the virtual object V12 pops out from the real object A1.

On the other hand, referring to FIG. 6, in the same manner as the case shown in FIG. 4, a size of a real object A2 in a real space E2 is a size Zar2. The display controller 115 may control a motion of a virtual object V22 on the basis of the size Zar2 of the real object A2 in the real space E2. For example, the display controller 115 may perform control such that the virtual object V22 has a predetermined second motion in the case where the size Zar2 of the real object A2 in the real space E2 is lower than a predetermined threshold. The predetermined second motion is not particularly limited, and corresponds to, in the example shown in FIG. 6, the motion that the virtual object V22 stays within the real object A1.

Further, for example, the display controller 115 may also control a size of a virtual object in an image Im in accordance with a size of a real object A in a real space E. For example, the display controller 115 may control the size of the virtual object in the image Im such that, the larger the size of the real object A in the real space E, the size of the virtual object in the image Im increases.

FIG. 7 is a diagram showing an example of controlling a size of a virtual object in an image Im on the basis of a size of a real object A in a real space E. With reference to FIG. 7, an example of controlling the size of the virtual object in the image Im on the basis of the size of the real object A in the real space E will be described.

Referring to FIG. 7, in the same manner as the case shown in FIG. 4, a size of a real object A1 in a real space E1 is a size Zar1. In the same manner as the case shown in FIG. 4, a size of a real object A2 in a real space E2 is a size Zar2.

Since the size Zar1 of the real object A1 in the real space E1 is larger than the size Zar2 of the real object A2 in the real space E2, the display controller 115 may render a size of a virtual object V13 in an image Im13 larger than a size of a virtual object V23 in an image Im23.

Heretofore, there has been described an example of controlling a display mode of the virtual object on the basis of the size of the real object A in the real space E. Note that the display controller 115 is also capable of calculating a position of the real object A in the real space E on the basis of the size of the real object A in the real space E. To be specific, the display controller 115 may calculate the position of the real object A in the real space E on the basis of the position of the real object A in the image Im and a ratio of the size of the real object A in the real space E to the size of the real object A in the image Im.

The display controller 115 may control the virtual object on the basis of the thus calculated position of the real object A in the real space E. Alternatively, the display controller 115 is also capable of calculating a distance between the imaging part 120 and the real object A on the basis of the position of the real object A in the real space E. Accordingly, the display controller 115 may also control the virtual object on the basis of the distance between the imaging part 120 and the real object A. The technique for controlling a virtual object may be performed in the same manner as the case of controlling the virtual object on the basis of the size of the real object A in the real space E as described above.

2-4. Operation Example of Information Processing Apparatus

Figure 8:
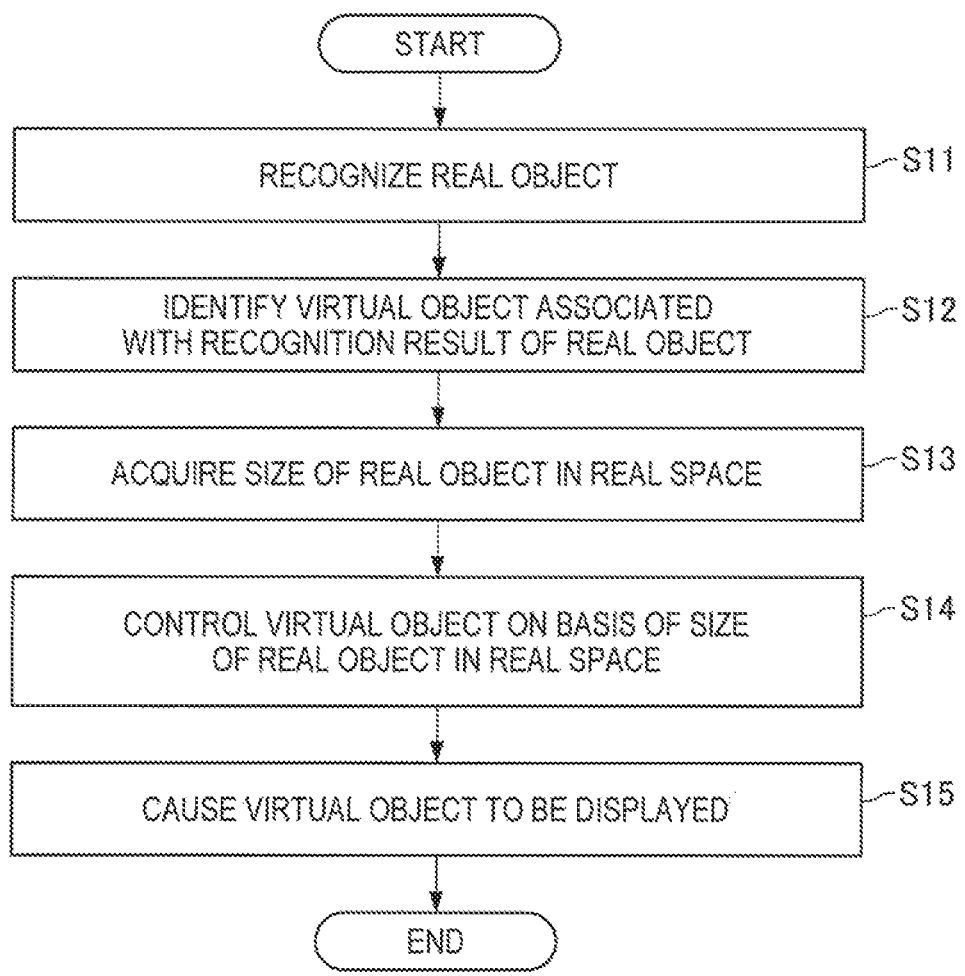
FIG. 8 is a flowchart showing an example of a flow of operations performed by the information processing apparatus according to the first embodiment of the present disclosure.

Next, there will be described an example of a flow of operations performed by the information processing apparatus 10A according to the first embodiment of the present disclosure. FIG. 8 is a flowchart showing an example of a flow of operations performed by the information processing apparatus 10A according to the first embodiment of the present disclosure. First, the imaging part 120 captures an image, the image acquisition part 111 acquires the image, and then the image recognition part 113 recognizes a real object A from the image acquired by the image acquisition part 111 (S11). The display controller 115 identifies a virtual object associated with the recognition result of the real object A (S12), and acquires the size of the real object A in the real space E (S13).

Subsequently, the display controller 115 controls the virtual object on the basis of the size of the real object A in the real space E (S14), and causes the virtual object to be displayed (S15). For example, in the case where the image recognition part 113 recognizes the position and the attitude of the real object A, the display controller 115 may cause the virtual object to be displayed at the position and in the attitude corresponding to the recognized position and attitude.

Heretofore, there has been described an example of a flow of operations performed by the information processing apparatus 10A according to the first embodiment of the present disclosure.

3. Second Embodiment

Subsequently, a second embodiment of the present disclosure will be described. In the first embodiment of the present disclosure, the description has been made of the case where the size of the real object A in the real space E is known, and, in the second embodiment of the present disclosure, description will be mainly made of the case of calculating the size of the real object A in the real space E.

3-1. Functional Configuration Example of Information Processing Apparatus

Figure 9:
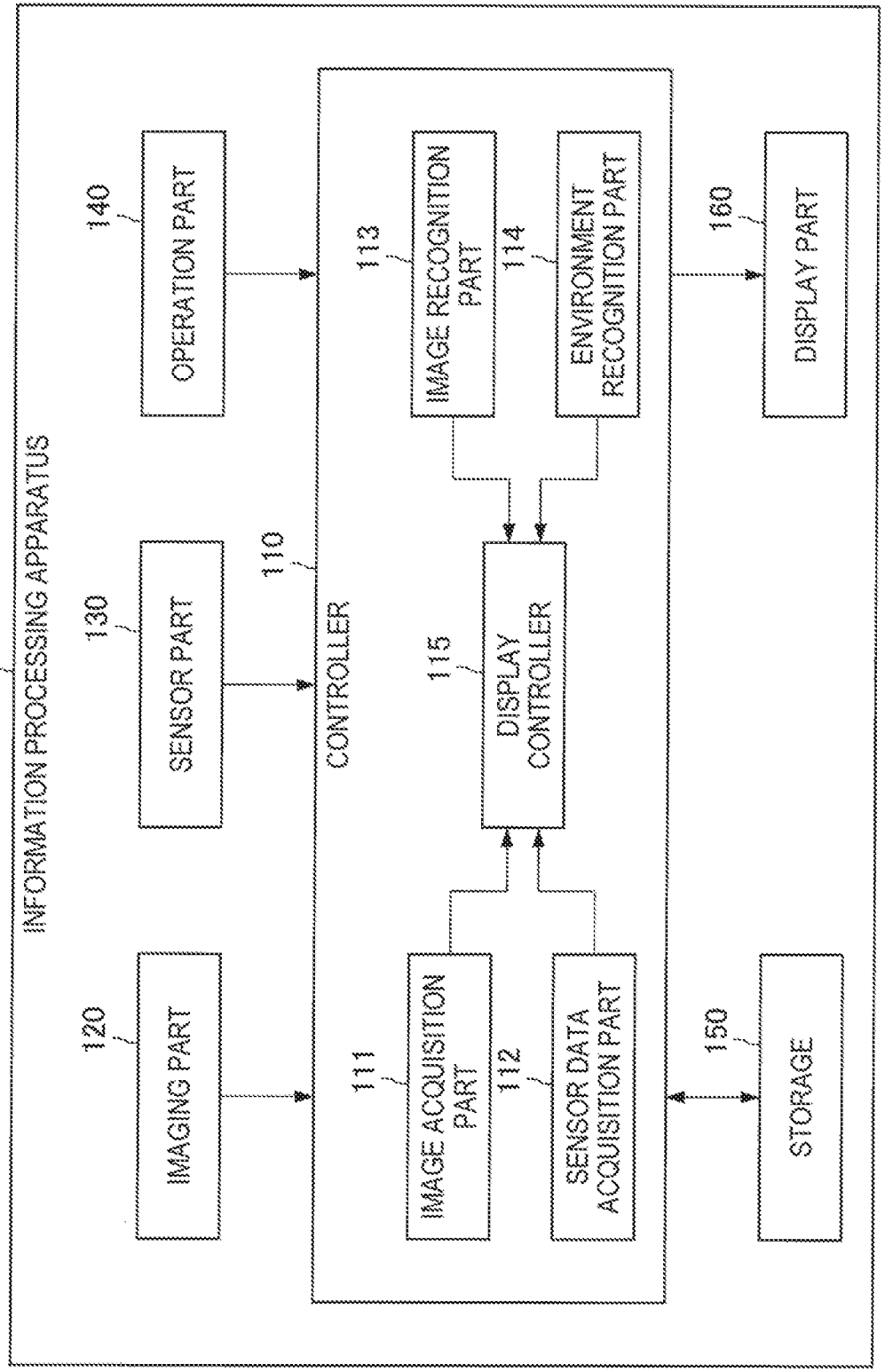
FIG. 9 is a diagram showing a functional configuration example of an information processing apparatus according to a second embodiment of the present disclosure.

Next, a functional configuration example of an information processing apparatus 10B according to the second embodiment of the present disclosure will be described. FIG. 9 is a diagram showing a functional configuration example of the information processing apparatus 10B according to the second embodiment of the present disclosure. As shown in FIG. 9, the information processing apparatus 10B includes a controller 110, an imaging part 120, a sensor part 130, an operation part 140, a storage 150, and a display part 160. The controller 110 has functional blocks such as an image acquisition part 111, a sensor data acquisition part 112, an image recognition part 113, an environment recognition part 114, and a display controller 115. The functions of the respective functional blocks will be described later.

3-2. Size of Real Object in Real Space

Figure 10:
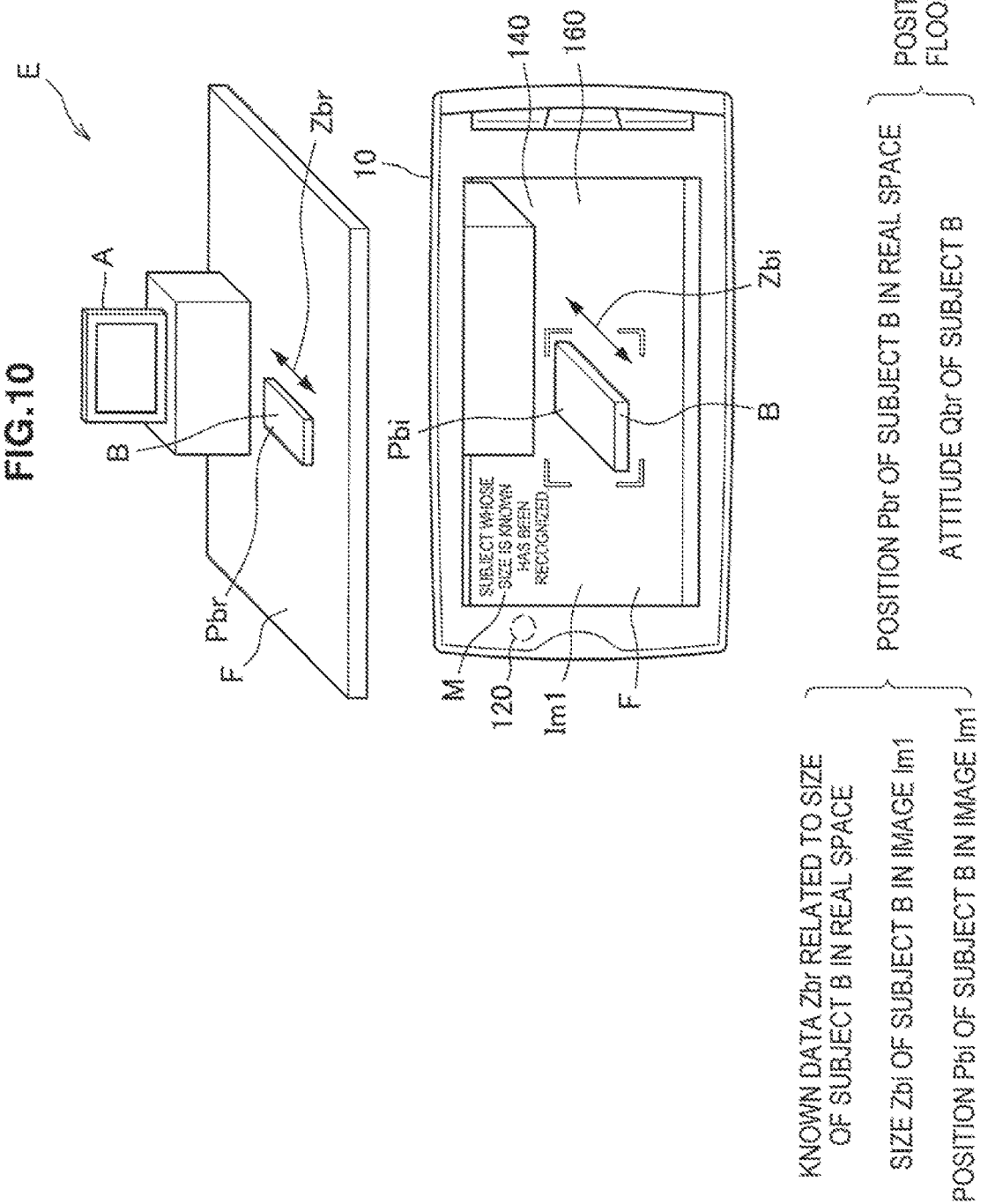
FIG. 10 is a diagram illustrating an example of a technique for calculating a size of a real object in a real space.
Figure 11:
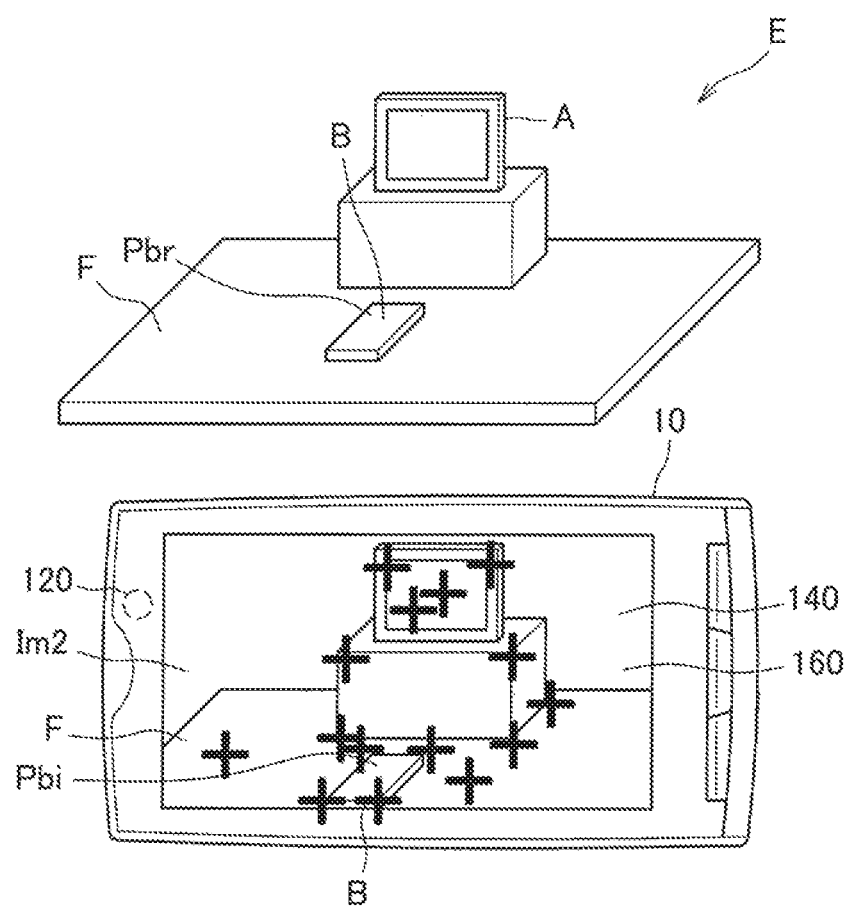
FIG. 11 is a diagram illustrating an example of a technique for calculating a size of a real object in a real space.
Figure 12:
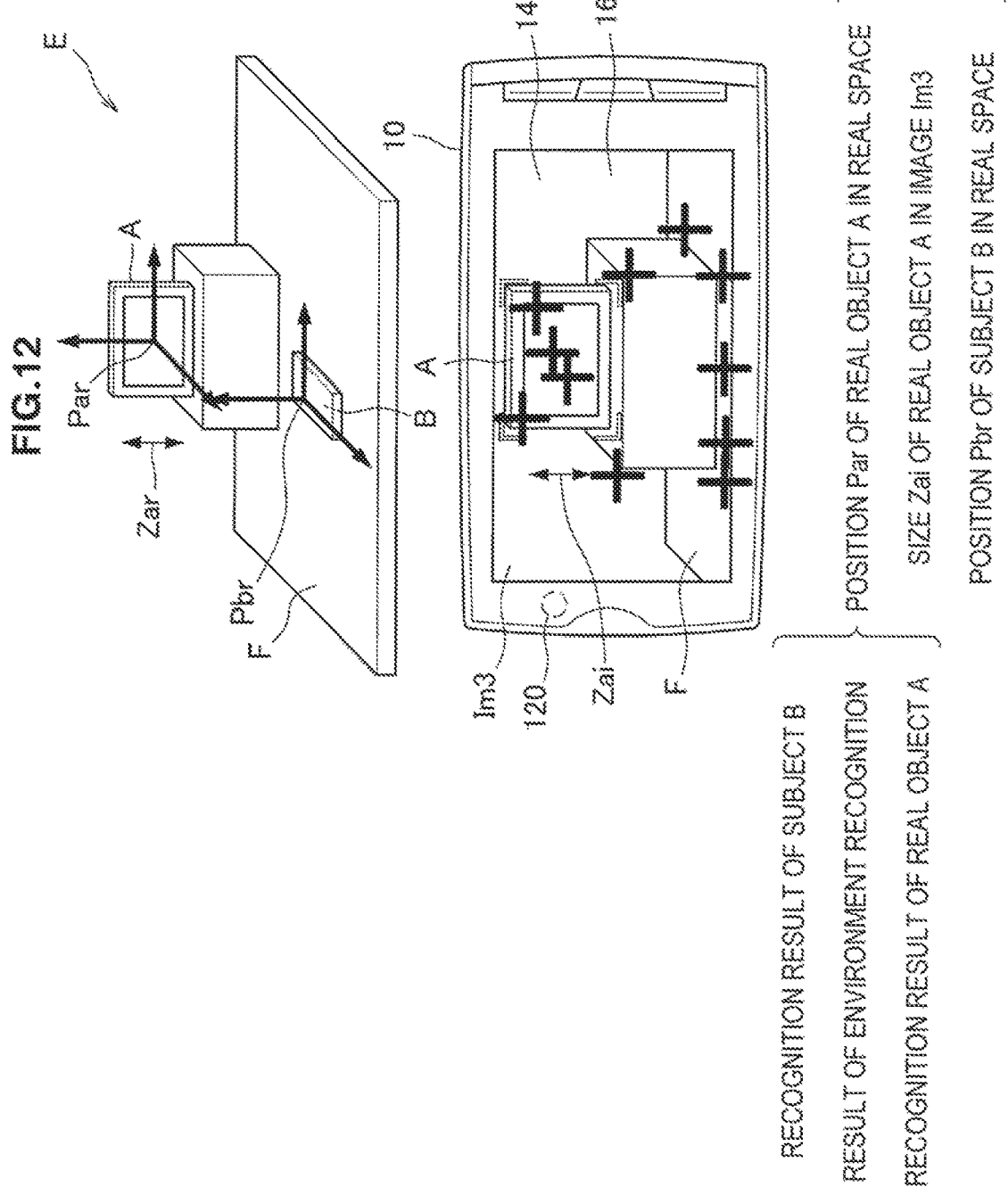
FIG. 12 is a diagram illustrating an example of a technique for calculating a size of a real object in a real space.

First, a technique for calculating a position of a real object A in a real space E will be described. FIGS. 10 to 12 are diagrams each illustrating an example of a technique for calculating a size of a real object A in a real space E. Referring to FIG. 10, a subject B is disposed on a floor surface F. In FIG. 10, the size of the subject B in the real space E is represented by a size Zbr, and the size Zbr of the subject B in the real space E is known. Accordingly, the size Zbr of the subject B in the real space E may be registered in the storage 150 in advance, or may be input by a user Ua through the operation part 140.

Note that, although description will be mainly made of the case where the subject B is a package of a digital versatile disk (DVD), the subject B may be a subject other than a package of DVD since the subject B is merely an example of a predetermined subject. Further, although description will be mainly made below of the case where the subject B is disposed on the floor surface F, the subject B is not necessarily disposed on the floor surface F. In addition, even in the case where the subject B is disposed on the floor surface F, the subject B may be disposed on a plane other than the floor surface F since the floor surface F is merely an example of a predetermined plane.

When a user Ua holds the imaging part 120 over the real space E, the imaging part 120 captures an image Im1, and the image recognition part 113 recognizes the subject B from the image Im1. To be specific, the image recognition part 113 recognizes a size Zbi of the subject B in the image Im1, a position Pbi of the subject B in the image Im1, and an attitude Qbr of the subject B. The display controller 115 calculates a position Pbr of the subject B in the real space E on the basis of the size Zbr of the subject B in the real space E, the size Zbi of the subject B in the image Im1, and the position Pbi of the subject B in the image Im1.

The display controller 115 is capable of identifying a position Pfr of the floor surface F in the real space E and an attitude Qfr of the floor surface F on the basis of the position Pbr of the subject B in the real space E and the attitude Qbr of the subject B. For example, the display controller 115 is capable of identifying the position Pbr of the subject B in the real space E as the position Pfr of the floor surface F in the real space E, and the attitude Qbr of the subject B as the attitude Qfr of the floor surface F.

Note that it is preferred that the fact that the position Pbr of the subject B in the real space E has been identified be notified to the user Ua. For example, the display controller 115 may cause the fact that the position Pbr of the subject B in the real space E has been identified to be displayed. In the example shown in FIG. 10, the fact that the position Pbr of the subject B in the real space E has been identified is shown as a message M of "a subject whose size is known has been recognized." However, the fact that the position Pbr of the subject B in the real space E has been identified is not limited to such an example.

Next, there may be a case where the user Ua changes the position and the attitude of the imaging part 120 in order to cause the imaging part 120 to capture the real object A. Accordingly, the display controller 115 may track the position and the attitude of the imaging part 120, and, on the basis of the tracking result, may track the position and the attitude of the subject B. The display controller 115 may track the position and the attitude of the imaging part 120 in any technique, and, as shown in FIG. 11, for example, the display controller 115 may track the position and the attitude of the imaging part 120 on the basis of a result of environment recognition performed by the environment recognition part 114.

As the environment recognition performed by the environment recognition part 114, calculation based on the SLAM technique can be used. According to the calculation based on the SLAM technique, a three-dimensional structure of the real space E shown in an image captured by the imaging part 120 and the position and the attitude of the imaging part 120 can be recognized dynamically. For initialization of a state variable in the SLAM technique, there may be used the position Pbr of the subject B in the real space E and the attitude Qbr of the subject B.

Next, the display controller 115 may calculate a position Par of the real object A in the real space E on the basis of a recognition result of the subject B recognized by the image recognition part 113, a result of environment recognition performed by the environment recognition part 114, and a recognition result of the real object A recognized by the image recognition part 113. To be specific, in the case where the image recognition part 113 recognizes the real object A, the display controller 115 may check feature points recognized by the image recognition part 113 against feature points obtained as a result of environment recognition, and may calculate, as a result of the matching check, the position Par of the real object A in the real space E.

Further, the display controller 115 is also capable of calculating a size Zar of the real object A in the real space E on the basis of the thus calculated position Par of the real object A in the real space E, a size Zai of the real object A in an image Im3, and the position Pbr of the subject B in the real space E.

Heretofore, a technique for calculating the position of the real object A in the real space E has been described.

3-3. Example of Display Control

Next, an example of controlling display of a virtual object will be described. As described above, since a position and an attitude of a floor surface F are identified, the display controller 115 is capable of controlling a virtual object on the basis of a distance in a real space E between a real object A and a floor surface F. FIG. 13 is a diagram illustrating an example of controlling a virtual object on the basis of a distance in a real space E between a real object A and a floor surface F.

Referring to FIG. 13, the distance in a real space E1 between a real object A1 and a floor surface F is represented by a distance Har1. The display controller 115 is capable of calculating the distance Har1 in the real space E1 between the real object A1 and the floor surface F, on the basis of a position Par of the real object A1 in the real space E1, and a position Pfr and an attitude Qfr of the floor surface F. The display controller 115 is capable of adjusting a virtual object V14 having a size corresponding to the size of the real object A1 in the real space E1 in accordance with the distance Har1.

For example, the display controller 115 is capable of moving the position of the virtual object V14 having the size corresponding to the size of the real object A1 in the real space E1 closer to the floor surface F by the distance Har1 in the real space E1. In this way, as shown in FIG. 13, the display controller 115 is capable of performing normally the placement of the virtual object V14, the normal state of which is that the virtual object V14 is present in contact with the floor surface F.

Further, referring to FIG. 13, the distance in a real space E2 between a real object A2 and the floor surface F is represented by a distance Har2. The display controller 115 is capable of calculating the distance Har2 in the real space E2 between the real object A2 and the floor surface F, on the basis of a position Par2 of the real object A2 in the real space E2, and a position Pfr and an attitude Qfr of the floor surface F. The display controller 115 is capable of adjusting a virtual object V24 having a size corresponding to the size of the real object A2 in the real space E2 in accordance with the distance Har2.

For example, the display controller 115 is capable of moving the position of the virtual object V24 having the size corresponding to the size of the real object A2 in the real space E2 closer to the floor surface F by the distance Har2 in the real space E2. In this way, as shown in FIG. 13, the display controller 115 is capable of performing normally the placement of the virtual object V24, the normal state of which is that the virtual object V24 is present in contact with the floor surface F.

Note that, in the example shown in FIG. 13, the size of the virtual object V14 in an image Im14 is controlled in accordance with the size of the real object A1 in the real space E1. In the same manner, in the example shown in FIG. 13, the size of the virtual object V24 in an image Im24 is controlled in accordance with the size of the real object A2 in the real space E2. If a virtual object is placed in the real size in the AR space, it enables the user Ua to feel the size of the virtual object more realistically.

Accordingly, in order that the virtual object is placed in the real size in the AR space, the display controller 115 may control the virtual object on the basis of the size of the real object A in the real space E and known data related to the real size of the virtual object. For example, the display controller 115 may identify the ratio of the size of the virtual object in the image to the size of the real object A in the image, on the basis of the relationship between the size of the real object A in the real space E and the known data related to the real size of the virtual object.

For example, the display controller 115 may perform control such that a ratio of the known data related to the real size of the virtual object to the size of the real object A in the real space E is equal to a ratio of the size of the virtual object in the image to the size of the real object A in the image. In this way, since the virtual object V14 placed in the real space E1 and the virtual object V24 placed in the real space E2 each have the real size of the virtual object, it enables the user Ua to feel the size of the virtual object more realistically.

Further, the display controller 115 may control the virtual object on the basis of a tilt of an object. For example, in the case where the sensor part 130 is capable of detecting a gravity direction G, the display controller 115 may control the virtual object on the basis of the relationship between the gravity direction G detected by the sensor part 130 and the object. For example, the gravity direction G can be detected by an acceleration sensor or the like. The gravity direction G detected by the sensor part 130 may be acquired by the sensor data acquisition part 112.

FIG. 14 is a diagram showing an example of controlling a virtual object on the basis of a relationship between the gravity direction G and the attitude of the subject B. The display controller 115 is capable of controlling the virtual object on the basis of the relationship between the gravity direction G and the attitude of the subject B.

Referring to FIG. 14, in a real space E30, the subject B having an attitude that matches the gravity direction G is disposed on the floor surface F. In such a case, a virtual object V30 associated with the recognition result of the real object A can be placed on the floor surface F. On the other hand, in a real space E31, the subject B having an attitude that does not match the gravity direction G is disposed on the floor surface F. In such a case, a virtual object V31 associated with the recognition result of the real object A can be placed on the floor surface F.

In FIG. 14, the display controller 115 places, in the AR space, the virtual object V30 indicating a state in which the attitude of the virtual object V30 stands still with respect to the floor surface F in the case where the attitude of the subject B matches the gravity direction G. On the other hand, the display controller 115 places, in the AR space, the virtual object V31 indicating a state in which the virtual object V31 slides on the floor surface F in the case where the attitude of the subject B does not match the gravity direction G. However, the virtual object V30 and the virtual object V31 may each be controlled in any way.

FIG. 15 is a diagram showing an example of controlling a virtual object on the basis of a relationship between the gravity direction G and the attitude of the real object A. The display controller 115 is also capable of controlling the virtual object on the basis of the relationship between the gravity direction G and the attitude of the real object A.

Referring to FIG. 15, in the real space E30, the real object A having an attitude that matches the gravity direction G is disposed on the floor surface F. In such a case, the virtual object V30 associated with the recognition result of the real object A can be placed on the floor surface F. On the other hand, in a real space E32, the real object A having an attitude that does not match the gravity direction G is disposed on the floor surface F. In such a case, a virtual object V32 associated with the recognition result of the real object A can be placed on the floor surface F.

In FIG. 15, the display controller 115 places, in the AR space, the virtual object V30 indicating a state in which the attitude of the virtual object V30 stands still with respect to the floor surface F in the case where the attitude of the real object A matches the gravity direction G. On the other hand, the display controller 115 places, in the AR space, the virtual object V32 indicating a state in which the virtual object V32 slides on the floor surface F in the case where the attitude of the real object A does not match the gravity direction G. However, the virtual object V30 and the virtual object V32 may each be controlled in any way.

In addition, the display controller 115 may control the virtual object on the basis of a relationship between the attitude of the floor surface F and the attitude of the real object A. In the same manner as in the case shown in FIG. 15, the display controller 115 may place, in the AR space, the virtual object V30 indicating a state in which the attitude of the virtual object V30 stands still with respect to the floor surface F in the case where the attitude of the real object A matches the attitude of the floor surface F. On the other hand, the display controller 115 places, in the AR space, the virtual object V32 indicating a state in which the virtual object V32 slides on the floor surface F in the case where the attitude of the real object A does not match the attitude of the floor surface F. However, the virtual object V30 and the virtual object V32 may each be controlled in any way.

3-4. Operation Example of Information Processing Apparatus

Figure 16:
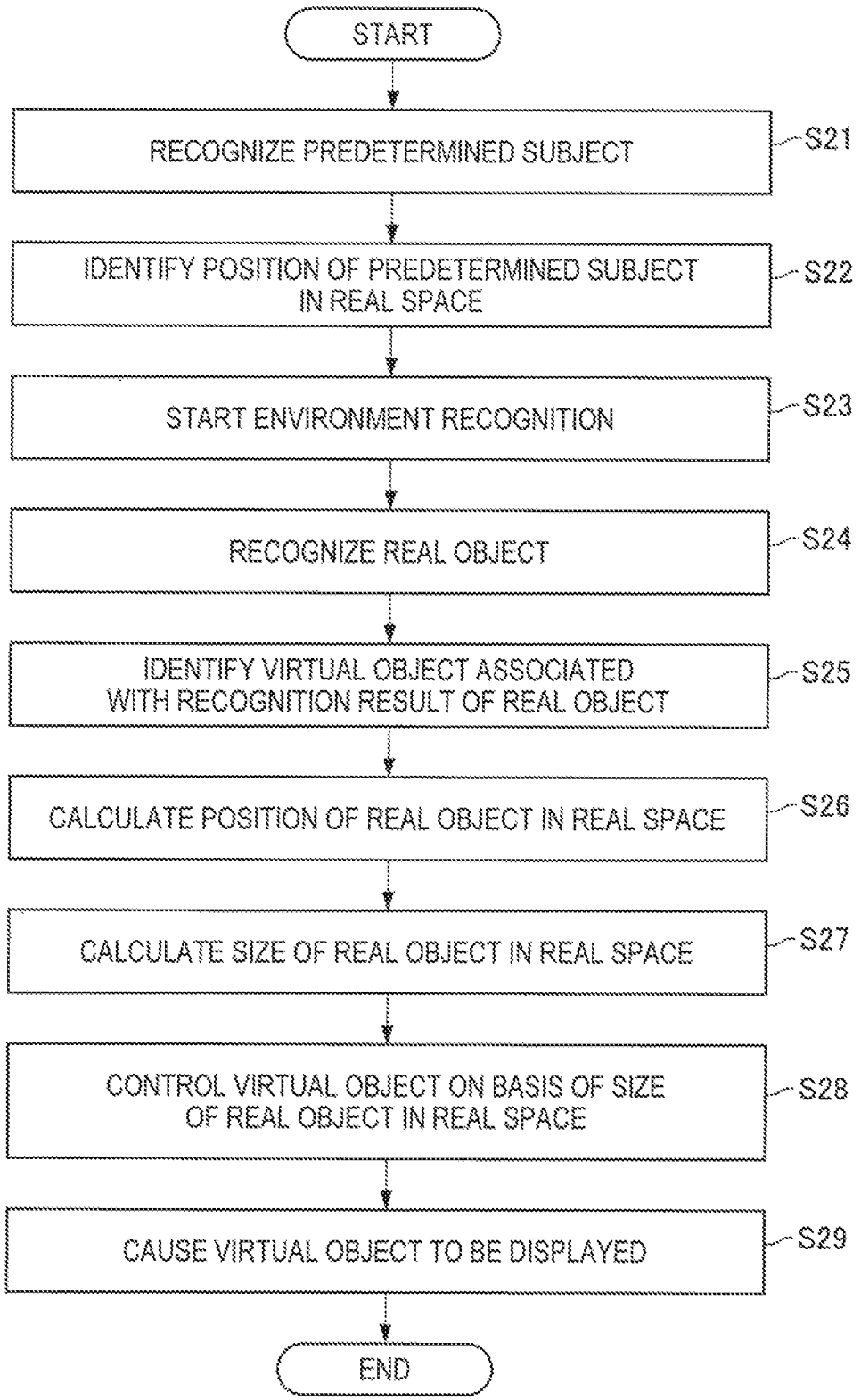
FIG. 16 is a flowchart showing an example of a flow of operations performed by the information processing apparatus according to the second embodiment of the present disclosure.

Next, there will be described an example of a flow of operations performed by the information processing apparatus 10B according to the second embodiment of the present disclosure. FIG. 16 is a flowchart showing an example of a flow of operations performed by the information processing apparatus 10B according to the second embodiment of the present disclosure. First, when the imaging part 120 captures an image and the image acquisition part 111 acquires the image, the image recognition part 113 recognizes a subject B from the image acquired by the image acquisition part 111 (S21). The display controller 115 identifies a position Pbr of the subject B in a real space E (S22), and the environment recognition part 114 starts environment recognition (S23).

Subsequently, the image recognition part 113 recognizes a real object A from the image acquired by the image acquisition part 111 (S24). The display controller 115 identifies a virtual object associated with the recognition result of the real object A (S25), and calculates a position Par of the real object A in the real space E (S26). In addition, the display controller 115 calculates a size Zar of the real object A in the real space E (S27), controls the virtual object on the basis of the size Zar of the real object A in the real space E (S28), and causes the virtual object to be displayed (S29).

Heretofore, there has been described an example of a flow of operations performed by the information processing apparatus 10B according to the second embodiment of the present disclosure.

4. Hardware Configuration Example

Figure 17:
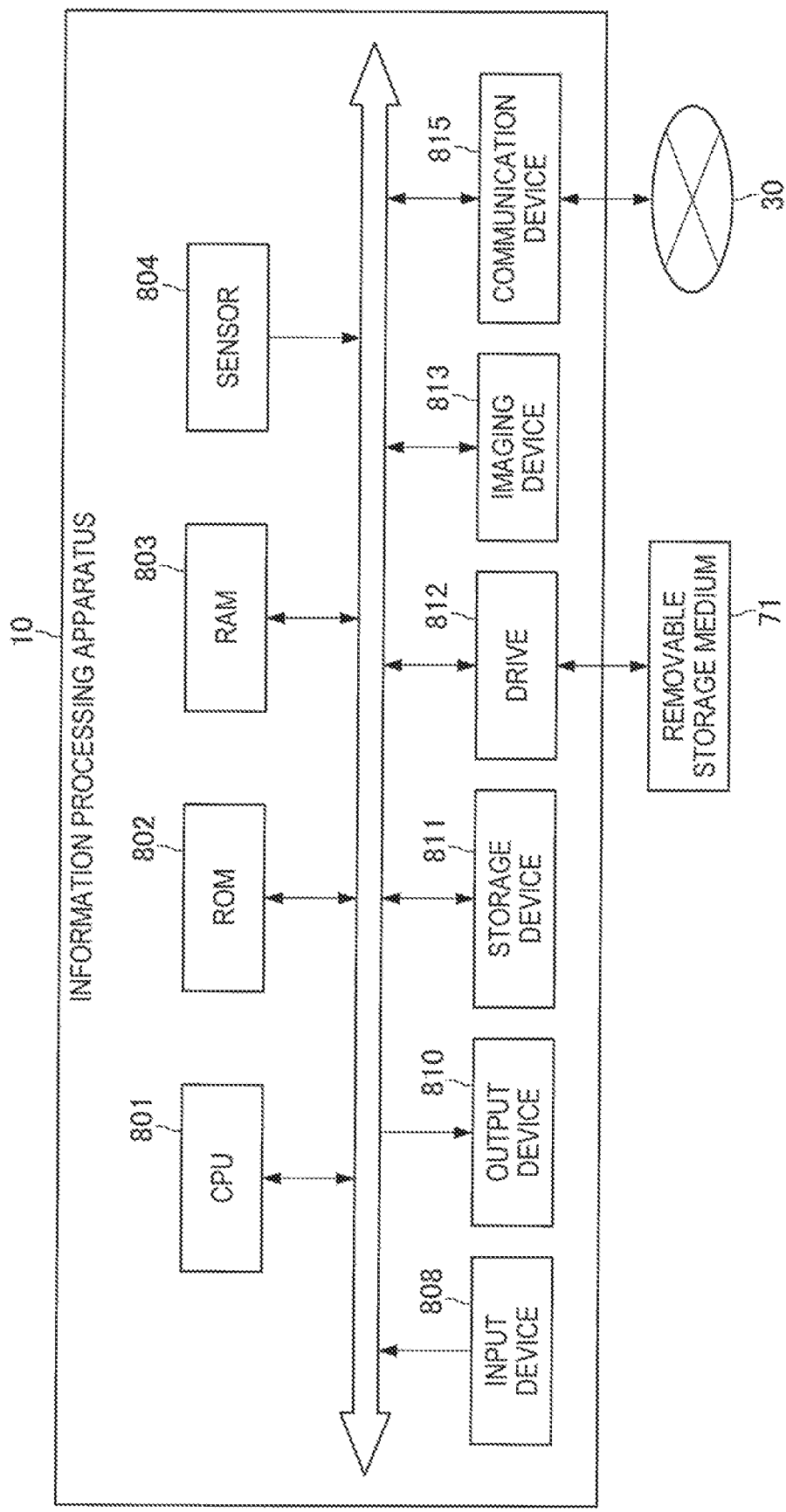
FIG. 17 is a diagram showing a hardware configuration example of an information processing apparatus according to an embodiment of the present disclosure.

Next, a hardware configuration example of the information processing apparatus 10 according to an embodiment of the present disclosure will be described. FIG. 17 is a diagram showing a hardware configuration example of the information processing apparatus 10 according to an embodiment of the present disclosure. It should be noted that the hardware configuration example shown in FIG. 17 is merely an example of a hardware configuration of the information processing apparatus 10. Accordingly, the hardware configuration of the information processing apparatus 10 is not limited to the example shown in FIG. 17.

As shown in FIG. 17, the information processing apparatus 10 includes a central processing unit (CPU) 801, read only memory (ROM) 802, random access memory (RAM) 803, a sensor 804, an input device 808, an output device 810, a storage device 811, a drive 812, an imaging device 813, and a communication device 815.

The CPU 801 functions as an arithmetic processing unit and a control unit, and controls entire operation of the information processing apparatus 10 in accordance with various programs. Further, the CPU 801 may be a microprocessor. The ROM 802 stores a program, a calculation parameter, and the like used by the CPU 801. The RAM 803 temporarily stores a program used in execution of the CPU 801, a parameter varying as appropriate during the execution, and the like. The CPU 801, the ROM 802, and the RAM 803 are connected with each other via the host bus configured from a CPU bus or the like.

The sensor 804 includes various types of detection sensors such as a terminal state detection sensor for detecting states of the information processing apparatus 10, and a peripheral circuit thereof. Examples of the sensor 804 include a tilt sensor, an acceleration sensor, an orientation sensor, a temperature sensor, a humidity sensor, and a light intensity sensor. A detection signal obtained by the sensor 804 is transmitted to the CPU 801. In this way, the CPU 801 can know the states (tilt, acceleration, orientation, temperature, humidity, light intensity, and the like) of the information processing apparatus 10.

The input device 808 is configured from, for example, an input part for inputting information by a user, such as a mouse, a keyboard, a touch panel, a button, a microphone, a switch, and a lever, and an input control circuit which generates an input signal based on the input by the user and outputs the generated input signal to the CPU 801. The user of the information processing apparatus 10 can input various kinds of data to the information processing apparatus 10 and can instruct the information processing apparatus 10 to perform a processing operation by operating the input device 808.

The output device 810 includes, for example, display devices such as a liquid crystal display (LCD) device, an organic light emitting diode (OLED) device, and a lamp. Further, the output device 810 includes audio output devices such as a speaker and headphones. For example, the display devices each display a captured image, a generated image, and the like. On the other hand, the audio output devices each convert audio data and the like into audio and output the audio.

The storage device 811 is a device for storing data, which is configured as an example of a storage of the information processing apparatus 10. The storage device 811 may include, for example, a storage medium, a recording device for recording data in the storage medium, a reading device for reading out the data from the storage medium, and a deletion device for deleting the data recorded in the storage medium. The storage device 811 stores a program and various data executed by the CPU 801.

The drive 812 is a reader/writer for the storage medium and is built in or externally attached to information processing apparatus 10. The drive 812 reads out information recorded in a removable storage medium 71 which is mounted thereto, such as a magnetic disk, an optical disc, a magneto-optical disk, or semiconductor memory, and outputs the information to the RAM 803. Further, the drive 812 can also write information in the removable storage medium 71.

The imaging device 813 includes an imaging optical system, such as a shooting lens and a zoom lens for focusing light, and a signal conversion device, such as a charge coupled device (CCD) or a complementary metal oxide semiconductor (CMOS). The imaging optical system focuses light emitted from a subject and forms an image of the subject on a signal conversion part, and the signal conversion device converts the formed image of the subject into an electrical image signal.

The communication device 815 is a communication interface which is configured from, for example, a communication device for establishing a connection with a network. In addition, the communication device 815 may be a wireless local area network (LAN) enabled communication device, a long term evolution (LTE) enabled communication device, or a wired communication device for performing wired communication. The communication device 815 can communicate with other devices via a network 30.

Heretofore, a hardware configuration example of the information processing apparatus 10 according to an embodiment of the present disclosure has been described.

5. Conclusion

As described above, according to the embodiments of the present disclosure, there is provided the information processing apparatus 10 including the image acquisition part 111 configured to acquire an image Im captured by the imaging part 120, and the display controller 115 configured to cause a virtual object to be displayed in accordance with a recognition result of a real object A shown in the image Im, wherein the display controller 115 controls the virtual object on the basis of a size Zar of the real object A in the real space E. According to such a configuration, it becomes possible to control the virtual object taking into account the size of the real object A in the real space E.

It should be understood by those skilled in the art that various modifications, combinations, sub-combinations and alterations may occur depending on design requirements and other factors insofar as they are within the scope of the appended claims or the equivalents thereof.

For example, the display part described above may be a head mounted display (HMD). For example, in the case where a non-transmissive HMD is used as the display part, the image is not necessarily displayed on the display part. In such a case, the display part may superimpose the virtual object over the real space, not over the image.

Further, in an embodiment of the present disclosure, the description has been mainly made of the example that the result of controlling the virtual object by the information processing apparatus 10 is reflected in the AR space of the information processing apparatus 10. However, for example, in the case where a single AR space is shared between the information processing apparatus 10 and other devices, the result of controlling the virtual object by the information processing apparatus 10 may be reflected in the AR space of the other devices which are communicable with the information processing apparatus 10.

Further, it is also possible to create a program for causing hardware such as a CPU, ROM, and RAM, which are built in a computer, to exhibit substantially the same functions as those of respective structures of the information processing apparatus 10 described above. Further, there is also provided a non-transitory computer-readable recording medium having the program recorded thereon.

Additionally, the present technology may also be configured as below.

(1) An information processing apparatus including:
an image acquisition part configured to acquire an image captured by an imaging part; and
a display controller configured to cause a virtual object to be displayed in accordance with a recognition result of a real object shown in the image, wherein the display controller controls the virtual object on a basis of a size of the real object in a real space.

(2) The information processing apparatus according to (1),
wherein the display controller calculates the size of the real object in the real space on a basis of a position of a predetermined subject in the real space, a size of the real object in the image, and a position of the real object in the real space, the position of the predetermined subject in the real space being identified in accordance with known data related to a size of the predetermined subject in the real space, a size of the predetermined subject in the image, and a position of the predetermined subject in the image.

(3) The information processing apparatus according to (2),
wherein the display controller controls the virtual object on a basis of a distance in the real space between the real object and a predetermined plane.

(4) The information processing apparatus according to (2),
wherein the display controller controls the virtual object on a basis of a relationship between a gravity direction and an attitude of the predetermined subject.

(5) The information processing apparatus according to (2),
wherein the display controller controls the virtual object on a basis of a relationship between a gravity direction and an attitude of the real object.

(6) The information processing apparatus according to (2),
wherein the display controller controls the virtual object on a basis of a relationship between an attitude of a predetermined plane and an attitude of the real object.

(7) The information processing apparatus according to any one of (3) to (6),
wherein, when the predetermined subject is disposed on the predetermined plane, the display controller identifies a position and an attitude of the predetermined plane in the real space on a basis of a position and an attitude of the predetermined subject in the real space.

(8) The information processing apparatus according to (2),
wherein the display controller causes a fact that the position of the predetermined subject in the real space has been identified to be displayed.

(9) The information processing apparatus according to (1),
wherein the display controller controls the virtual object on a basis of a position of the real object in the real space.

(10) The information processing apparatus according to (1),
wherein the display controller controls the virtual object on a basis of a distance between the imaging part and the real object.

(11) The information processing apparatus according to any one of (1) to (10),
wherein the display controller controls the virtual object on a basis of the size of the real object in the real space and known data related to a real size of the virtual object.

(12) The information processing apparatus according to (11),
wherein the display controller identifies a ratio of a size of the virtual object in the image to a size of the real object in the image on a basis of a relationship between the size of the real object in the real space and the known data related to the real size of the virtual object.

(13) The information processing apparatus according to (1),
wherein the display controller acquires the size of the real object in the real space.

(14) The information processing apparatus according to (2),
wherein the display controller calculates the position of the real object in the real space on a basis of a recognition result of the predetermined subject, a result of environment recognition, and a recognition result of the real object.

(15) The information processing apparatus according to any one of (1) to (14),
wherein the display controller selects the virtual object on a basis of the size of the real object in the real space.

(16) The information processing apparatus according to any one of (1) to (14),
wherein the display controller controls a display mode of the virtual object in accordance with the size of the real object in the real space.

(17) The information processing apparatus according to (16),
wherein the display controller controls a motion of the virtual object in accordance with the size of the real object in the real space.

(18) The information processing apparatus according to (16),
wherein the display controller controls a size of the virtual object in the image in accordance with the size of the real object in the real space.

(19) An information processing method including:
acquiring an image captured by an imaging part;
causing a virtual object to be displayed in accordance with a recognition result of a real object shown in the image; and
controlling the virtual object on a basis of a size of the real object in a real space.

(20) A non-transitory computer-readable recording medium having a program recorded thereon, the program being for causing a computer to function as an information processing apparatus including
an image acquisition part configured to acquire an image captured by an imaging part, and
a display controller configured to cause a virtual object to be displayed in accordance with a recognition result of a real object shown in the image,
wherein the display controller controls the virtual object on a basis of a size of the real object in a real space.

What is claimed is:
1. An information processing apparatus, comprising:
circuitry configured to:
    acquire an image of a real space;
    recognize a three-dimensional space structure of the real space based on the acquired image;
    calculate a size, a position, and an attitude of a real object in the real space based on the recognized three-dimensional space structure, wherein the calculated size of the real object in the real space is different from a size of the real object in the acquired image;
    control a size, a position, and an attitude of a virtual object based on the calculated size, the position, and the attitude of the real object;
    control display of the virtual object;
    control a first motion of the virtual object based on the calculated size of the real object in the real space is higher than a threshold size; and
    control a second motion of the virtual object based on the calculated size of the real object in the real space is lower than the threshold size, wherein the second motion of the virtual object corresponds to a movement of the virtual object where the virtual object stays within the real object.

2. The information processing apparatus according to claim 1, wherein the circuitry is further configured to calculate the size of the real object in the real space based on:
a position of a subject in the real space, and
the size of the real object in the acquired image.

3. The information processing apparatus according to claim 2, wherein the circuitry is further configured to control the virtual object based on a relationship between a gravity direction and an attitude of the subject.

4. The information processing apparatus according to claim 2, wherein the circuitry is further configured to control the virtual object based on a relationship between an attitude of a specific plane and the attitude of the real object.

5. The information processing apparatus according to claim 2, wherein the circuitry is further configured to identify a position of a specific plane and an attitude of the specific plane in the real space based on the position of the subject and an attitude of the subject in the real space in case the subject is on the specific plane.

6. The information processing apparatus according to claim 2, wherein the circuitry is further configured to:
identify the position of the subject in the real space based on data related to a size of the subject in the real space, a size of the subject in the image, and a position of the subject in the image; and
control the virtual object based on the position of the real object in the real space.

7. The information processing apparatus according to claim 1, wherein the circuitry is further configured to control the virtual object based on a relationship between a gravity direction and the attitude of the real object.

8. The information processing apparatus according to claim 1, wherein the circuitry is further configured to control the virtual object based on the size of the real object in the real space and data related to a real size of the virtual object.

9. The information processing apparatus according to claim 8, wherein the circuitry is further configured to identify a ratio of the size of the virtual object in the acquired image to the size of the real object in the acquired image based on a relationship between the size of the real object in the real space and the data related to the real size of the virtual object.

10. The information processing apparatus according to claim 1, wherein the circuitry is further configured to select the virtual object based on the size of the real object in the real space.

11. The information processing apparatus according to claim 1, wherein the circuitry is further configured to control a display mode of the virtual object based on the size of the real object in the real space.

12. The information processing apparatus according to claim 1, wherein the circuitry is further configured to control the size of the virtual object in the acquired image based on the size of the real object in the real space.

13. The information processing apparatus according to claim 1, wherein
the circuitry is further configured to calculate a distance between the real object and a specific plane in the real space, and
the calculated distance corresponds to a distance in the real space.

14. A method, comprising:
in an information processing apparatus:
acquiring an image of a real space;
recognizing a three-dimensional space structure of the real space based on the acquired image;
calculating a size, a position, and an attitude of a real object in the real space based on the recognized three-dimensional space structure, wherein the calculated size of the real object in the real space is different from a size of the real object in the acquired image;
controlling a size, a position, and an attitude of a virtual object based on the calculated size, the position, and the attitude of the real object;
controlling display of the virtual object;
controlling a first motion of the virtual object based on the calculated size of the real object in the real space is higher than a threshold size; and
controlling a second motion of the virtual object based on the calculated size of the real object in the real space is lower than the threshold size, wherein the second motion of the virtual object corresponds to a movement of the virtual object where the virtual object stays within the real object.

15. The method according to claim 14, further comprising calculating the size of the real object in the real space based on:
a position of a subject in the real space; and
the size of the real object in the acquired image.

16. The method according to claim 15, further comprising controlling the virtual object based on a relationship between a gravity direction of the subject and an attitude of the subject.

17. A non-transitory computer-readable medium having stored thereon, computer-executable instructions, which when executed by a computer, cause the computer to execute operations, the operations comprising:
acquiring an image of a real space;
recognizing a three-dimensional space structure of the real space based on the acquired image;
calculating a size, a position, and an attitude of a real object in the real space based on the recognized three-dimensional space structure, wherein the calculated size of the real object in the real space is different from a size of the real object in the acquired image;
controlling a size, a position, and an attitude of a virtual object based on the calculated size, the position, and the attitude of the real object;
controlling display of the virtual object; and
controlling a first motion of the virtual object based on the calculated size of the real object in the real space is higher than a threshold size; and
controlling a second motion of the virtual object based on the calculated size of the real object in the real space is lower than the threshold size, wherein the second motion of the virtual object corresponds to a movement of the virtual object where the virtual object stays within the real object.

18. The non-transitory computer-readable medium according to claim 17, wherein the operations further comprising calculating the size of the real object in the real space based on:
a position of a subject in the real space; and
the size of the real object in the acquired image.

* * * * *